US012628229B2

(12) United States Patent　　(10) Patent No.:　US 12,628,229 B2
　　Zhu et al.　　　　　　　　　　　(45) Date of Patent:　　May 12, 2026

(54) METHOD AND APPARATUS FOR BEAM FAILURE DETECTION, REQUEST, AND RECOVERY UNDER A UNIFIED TCI FRAMEWORK

(71) Applicant: Samsung Electronics Co., Ltd., Suwon-si (KR)

(72) Inventors: Dalin Zhu, Allen, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 709 days.

(21) Appl. No.: 18/060,522

(22) Filed: Nov. 30, 2022

(65) Prior Publication Data

US 2023/0180331 A1　　　Jun. 8, 2023

Related U.S. Application Data

(60) Provisional application No. 63/286,856, filed on Dec. 7, 2021.

(51) Int. Cl.
　　*H04W 72/02*　　　(2009.01)
　　*H04W 24/04*　　　(2009.01)
　　　　　　(Continued)

(52) U.S. Cl.
　　CPC ........... *H04W 76/19* (2018.02); *H04W 24/04* (2013.01); *H04W 72/21* (2023.01); *H04W 72/23* (2023.01)

(58) Field of Classification Search
　　CPC ..... H04W 16/28; H04B 7/043; H04B 7/0016; H04B 7/0617; H04B 7/0695; H04B 17/309; H04B 17/043; H04B 17/0016
　　See application file for complete search history.

(56)　　　　　References Cited

U.S. PATENT DOCUMENTS

2021/0320710 A1　10/2021　Koskela et al.
2022/0200687 A1*　6/2022　Guo ................... H04B 7/06964
2022/0225135 A1*　7/2022　Cirik ..................... H04W 24/08

FOREIGN PATENT DOCUMENTS

WO　　2021207562 A1　10/2021
WO　　2021228869 A2　11/2021
WO　　2023101334 A1　6/2023

OTHER PUBLICATIONS

International Search Report and Written Opinion issued Mar. 6, 2023 regarding International Application No. PCT/KR2022/019762, 6 pages.

(Continued)

*Primary Examiner* — Bo Hui A Zhu
*Assistant Examiner* — Alvin Zhu

(57)　　　　　ABSTRACT

Methods and apparatuses for beam failure detection, request, and recovery under a unified transmission configuration indication (TCI) framework in a wireless communication system. A method for operating a user equipment (UE) includes receiving information associated with a transmission configuration indication (TCI) state for the UE and identifying, based on the information, an uplink (UL) TCI state or a joint downlink (DL) and UL TCI state for a physical uplink control channel (PUCCH). The method further includes determining, based on the UL TCI state or the joint DL and UL TCI state for the PUCCH, a first beam failure detection (BFD) reference signal (RS) to monitor and monitoring for an UL beam failure based on the first BFD RS.

11 Claims, 10 Drawing Sheets

(51) Int. Cl.

| | |
|---|---|
| *H04W 72/21* | (2023.01) |
| *H04W 72/23* | (2023.01) |
| *H04W 76/19* | (2018.01) |

(56) References Cited

OTHER PUBLICATIONS

Futurewei, "Enhancement on multi-beam operation", 3GPP TSG RAN WG1 Meeting #107-e, R1-2110883, Nov. 2021, 4 pages.

Samsung, "Multi-beam enhancements", 3GPP TSG RAN WG1 Meeting #107-e, R1-2111717, Nov. 2021, 13 pages.

NTT Docomo, Inc., "Discussion on multi-beam operation", 3GPP TSG RAN WG1 Meeting #107-e, R1-2112089, Nov. 2021, 14 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

Extended European Search Report issued Jan. 27, 2025 regarding Application No. 22904643.8, 11 pages.

* cited by examiner

600

604

603 Beam Width

605

Point A

Beam Direction

602

601

Point B

606

650

Beam Width

Beam Direction

METHOD AND APPARATUS FOR BEAM FAILURE DETECTION, REQUEST, AND RECOVERY UNDER A UNIFIED TCI FRAMEWORK

CROSS-REFERENCE TO RELATED APPLICATIONS AND CLAIM OF PRIORITY

The present application claims priority to the U.S. Provisional Patent Application No. 63/286,856, filed on Dec. 7, 2021. The contents of the above-identified patent documents are incorporated herein by reference.

TECHNICAL FIELD

The present disclosure relates generally to wireless communication systems and, more specifically, the present disclosure relates to a beam failure detection, request, and recovery under a unified transmission configuration indication (TCI) framework in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a beam failure detection, request, and recovery under a unified TCI framework in a wireless communication system.

In one embodiment, a user equipment (UE) is provided. The UE includes a transceiver configured to receive information associated with a transmission configuration indication (TCI) state for the UE and a processor operably coupled to the transceiver. The processor is configured to identify, based on the information, an uplink (UL) TCI state or a joint downlink (DL) and UL TCI state for a physical uplink control channel (PUCCH); determine, based on the UL TCI state or the joint DL and UL TCI state for the PUCCH, a first beam failure detection (BFD) reference signal (RS) to monitor; and monitor, via the transceiver, for an UL beam failure based on the first BFD RS.

In another embodiment, a base station (BS) is provided. The BS includes a transceiver configured to transmit information associated with a TCI state for a UE. The information indicates an UL TCI state or a joint DL and UL TCI state for a PUCCH. The UL TCI state or the joint DL and UL TCI state for the PUCCH indicates a first BFD RS for the UE to monitor for an UL beam failure. The transceiver is further configured to transmit the first BFD RS.

In yet another embodiment, a method for operating a UE is provided. The method includes receiving information associated with a TCI state for the UE and identifying, based on the information, an UL TCI state or a joint DL and UL TCI state for a PUCCH. The method further includes determining, based on the UL TCI state or the joint DL and UL TCI state for the PUCCH, a first beam failure detection BFD RS to monitor and monitoring for an UL beam failure based on the first BFD RS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR, Physical channels and modulation"; 3GPP TS 38.212 v16.1.0, "NR, Multiplexing and Channel coding"; 3GPP TS 38.213 v16.1.0, "NR, Physical Layer Procedures for Control"; 3GPP TS 38.214 v16.1.0, "NR, Physical Layer Procedures for Data"; 3GPP TS 38.321 v16.1.0, "NR, Medium Access Control (MAC) protocol specification"; and 3GPP TS 38.331 v16.1.0, "NR, Radio Resource Control (RRC) Protocol Specification."

Figure 1:
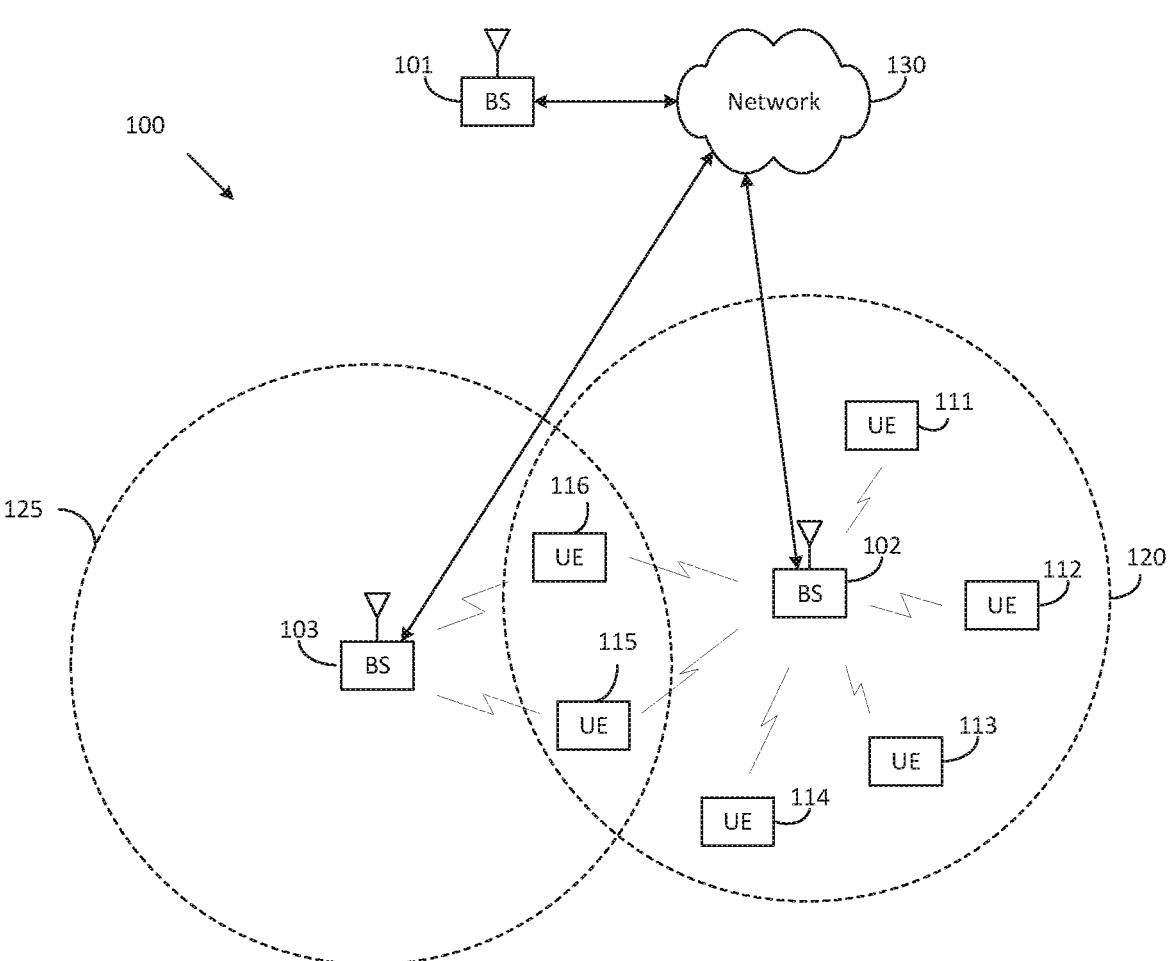
FIG. 1 illustrates an example of wireless network according to embodiments of the present disclosure.
Figure 2:
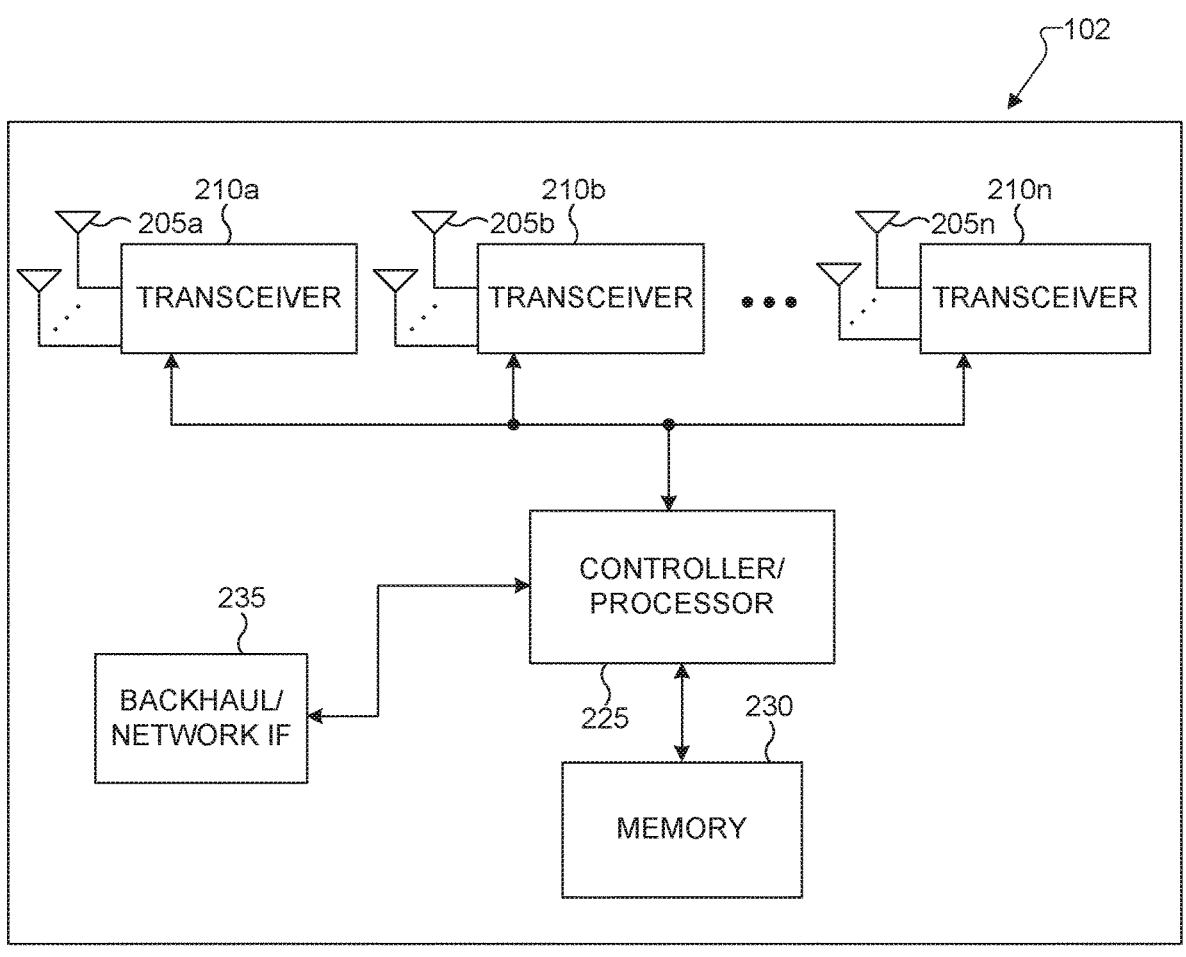
FIG. 2 illustrates an example of gNB according to embodiments of the present disclosure.
Figure 3:
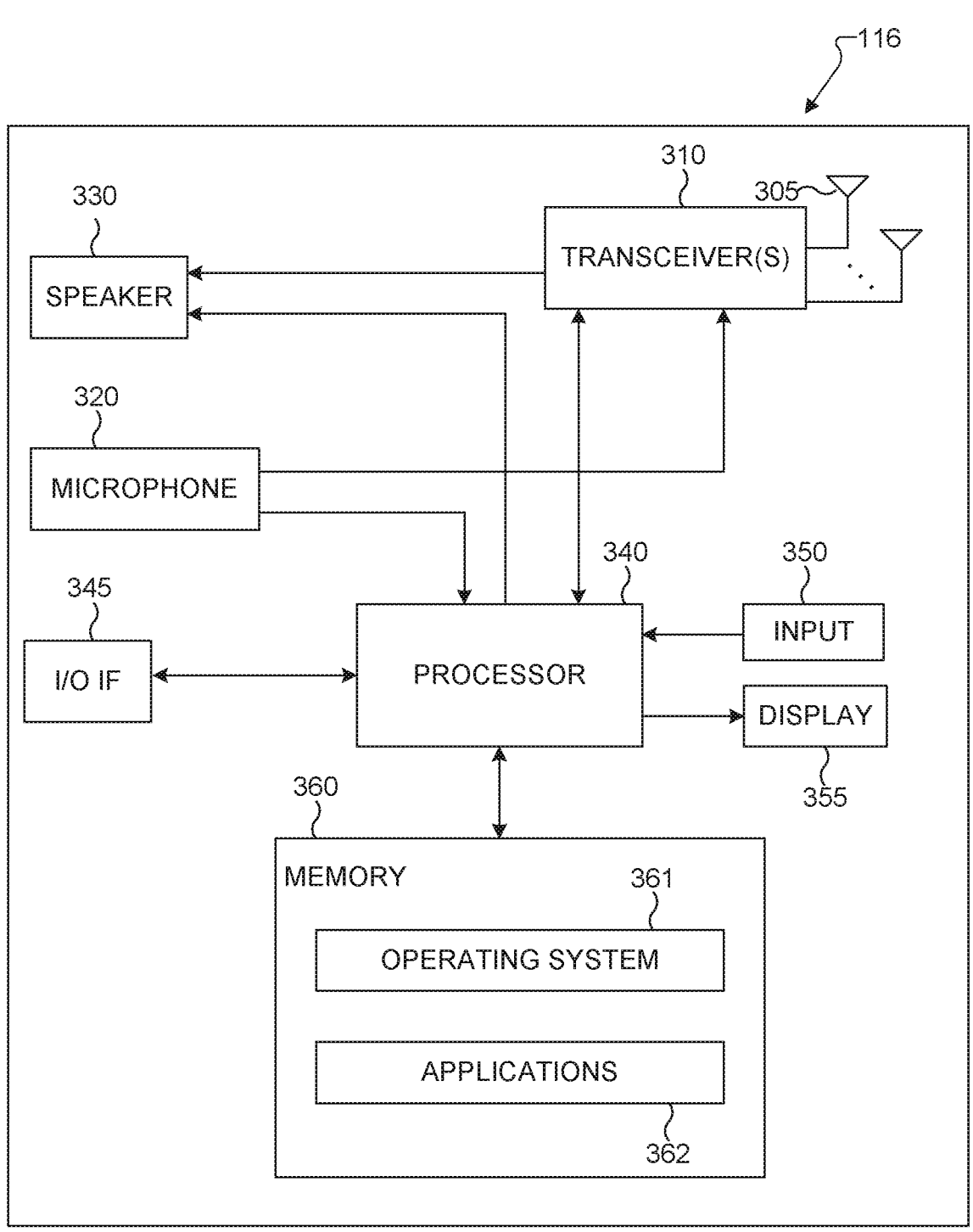
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a beam failure detection, request, and recovery under a unified TCI framework in a wireless communication system. In certain embodiments, and one or more of the gNBs 101-103 includes circuitry, programing, or a combination thereof, for a beam failure detection, request, and recovery under a unified TCI framework in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. As discussed in greater detail below, the controller/processor 225 can support a beam failure detection, request, and recovery under a unified TCI framework in a wireless communication system. In other examples, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for beam failure detection, request, and recovery under a unified TCI framework in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
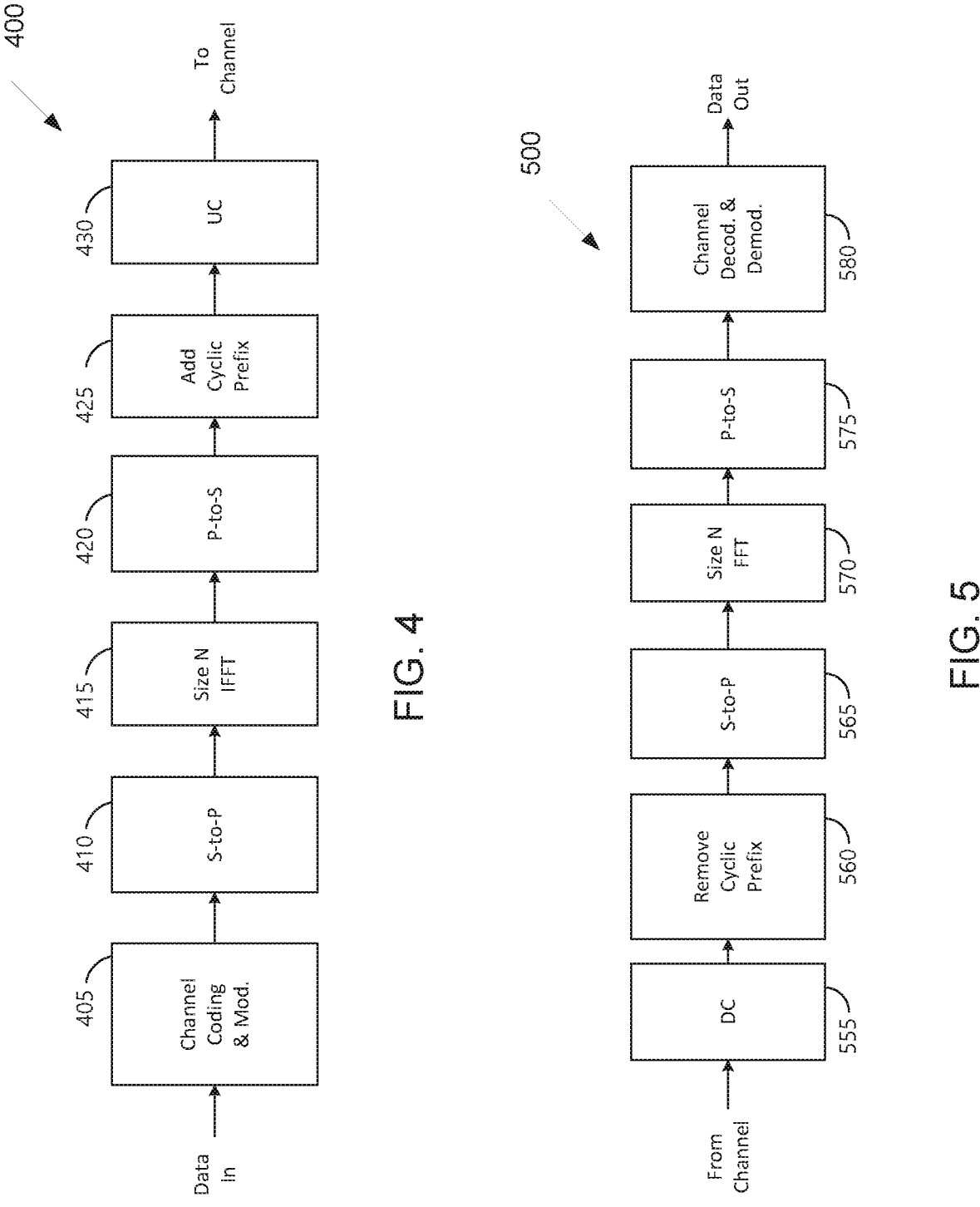
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol.

The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship or spatial relation between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
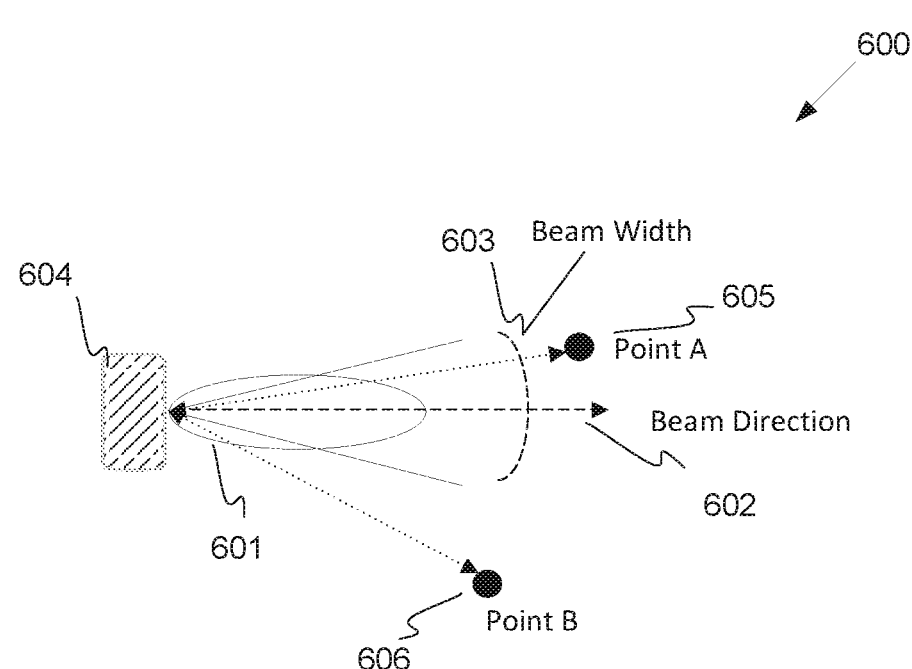
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
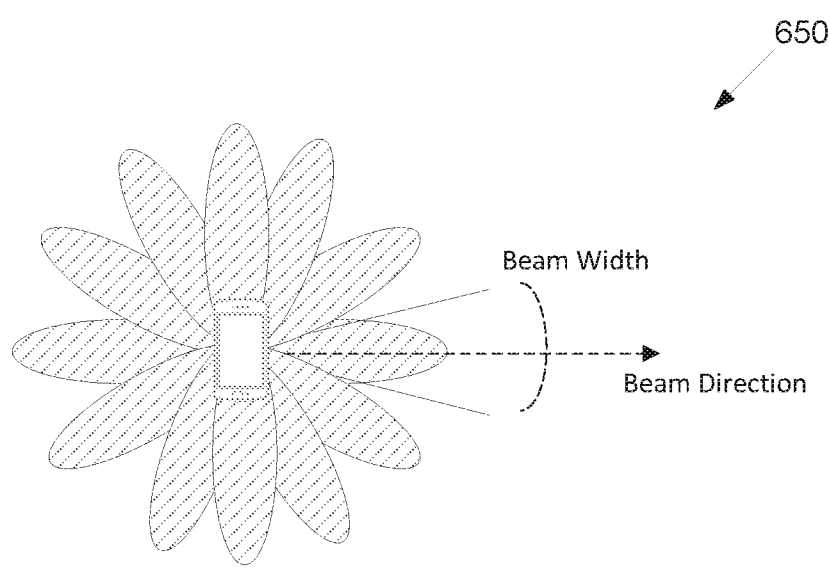
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
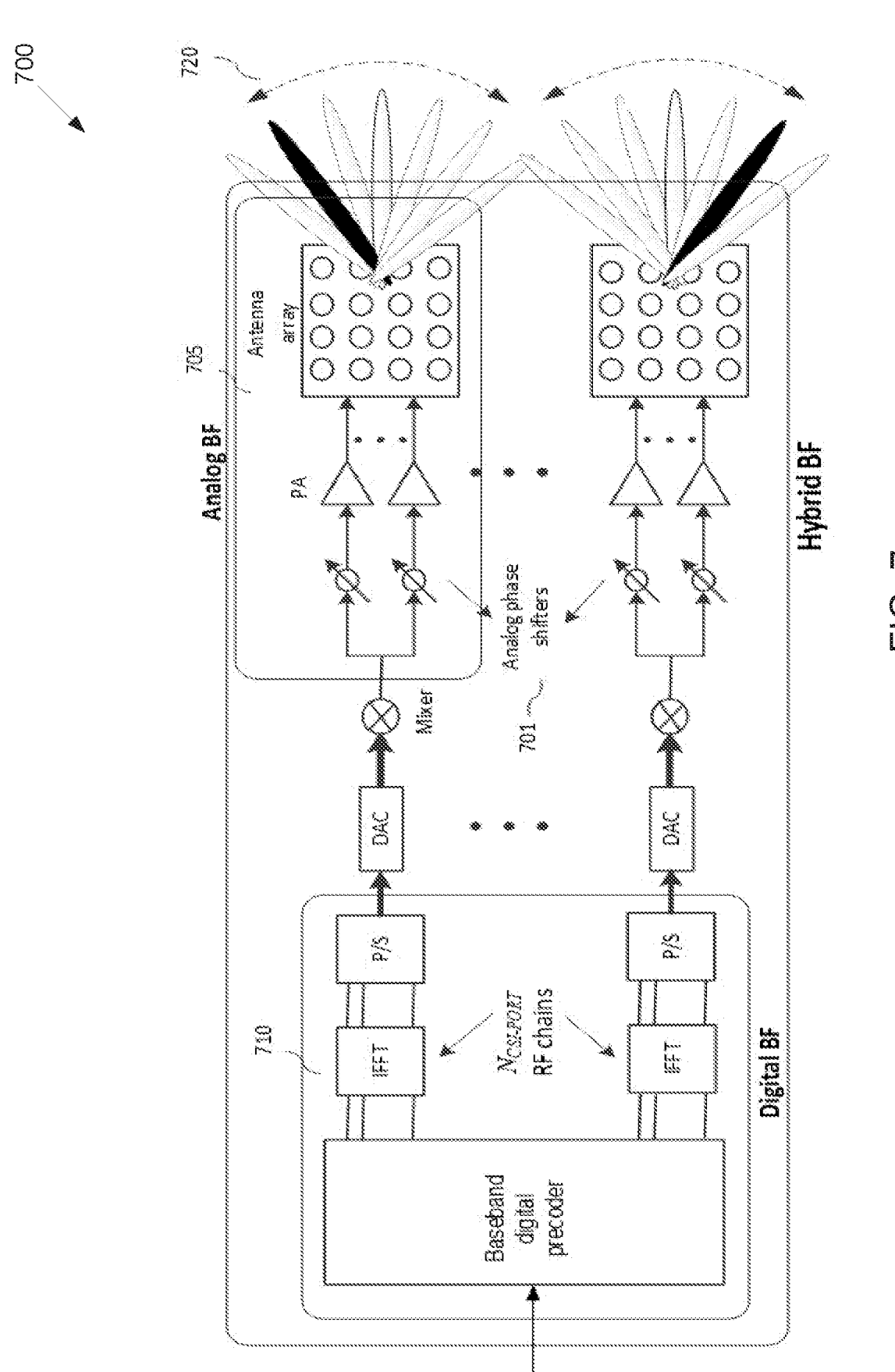
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

Throughout the present disclosure, the term "configuration" or "higher layer configuration" and variations thereof (such as "configured" and so on) could be used to refer to one or more of: a system information signaling such as by a MIB or a SIB (such as SIB1), a common or cell-specific higher layer/RRC signaling, or a dedicated or UE-specific or BWP-specific higher layer/RRC signaling.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values: (1) 'typeA': {Doppler shift, Doppler spread, average delay, delay spread}, (2) 'typeB': {Doppler shift, Doppler spread}, (3) 'typeC': {Doppler shift, average delay}, and (4) 'typeD': {Spatial Rx parameter}.

The UE can be configured with a list of up to 128 DLorJointTCIState configurations, within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS.

If the DLorJointTCIState or UL-TCIState configurations are absent in a BWP of the CC, the UE can apply the DLorJointTCIState or UL-TCIState configurations from a reference BWP of a reference CC. The UE is not expected to be configured with TCI-State, SpatialRelationInfo or PUCCH-SpatialRelationInfo, except SpatialRelationInfo-Pos in a CC in a band, if the UE is configured with DLorJointTCIState or UL-TCIState in any CC in the same band. The UE can assume that when the UE is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE is not configured with DLorJointTCIState or UL-TCIState in any CC within the same band in the CC list.

The UE receives an activation command, as described in clause 6.1.3.14 of [10, TS 38.321] or 6.1.3.x of [10, TS 38.321], used to map up to 8 TCI states and/or pairs of TCI states, with one TCI state for DL channels/signals and one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs.

The Unified TCI States Activation/Deactivation MAC CE is identified by a MAC subheader with eLCID as specified in Table 6.2.1-1b in TS 38.321. It has a variable size consisting of one or more of the following fields: (1) serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331, this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively; (2) DL BWP ID: This field indicates a DL BWP for which the MAC CE applies as the codepoint of the DCI bandwidth part indicator field as specified in TS 38.212. The length of the BWP ID field is 2 bits; (3) UL BWP ID: This field indicates a UL BWP for which the MAC CE applies as the codepoint of the DCI bandwidth part indicator field as specified in TS 38.212. The length of the BWP ID field is 2 bits; (4) $P_i$: This field indicates whether each TCI codepoint has multiple TCI states or single TCI state. If $P_i$ field set to 1, it indicates that $i^{th}$ TCI codepoint includes the DL TCI state and the UL TCI state. If $P_i$ field set to 0, it indicates that $i^{th}$ TCI codepoint includes only the DL TCI state or the UL TCI state; (5) D/U: This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink; (6) TCI state ID: This field indicates the TCI state identified by TCI-StateId as specified in TS 38.331. If D/U is set to 1, 7-bits length TCI state ID i.e. TCI-StateId as specified in TS 38.331 is used. If D/U is set to 0, the most significant bit of TCI state ID is considered as the reserved bit and remainder 6 bits indicate the UL-TCIState-Id as specified in TS 38.331. The maximum number of activated TCI states is 16; (7) R: Reserved bit, set to 0.

The CellGroupConfig IE specified in the TS 38.331 is used to configure a master cell group (MCG) or secondary cell group (SCG). A cell group comprises of one MAC entity, a set of logical channels with associated RLC entities and of a primary cell (SpCell) and one or more secondary cells (SCells).

simultaneousTCI-UpdateList1, simultaneousTCI-UpdateList2 are list of serving cells which can be updated simultaneously for TCI relation with a MAC CE. The simultaneousTCI-UpdateList1 and simultaneousTCI-UpdateList2 shall not contain same serving cells. Network should not configure serving cells that are configured with a BWP with two different values for the coresetPoolIndex in these lists.

simultaneousU-TCI-UpdateList1, simultaneousU-TCI-UpdateList2, simultaneousU-TCI-UpdateList3, simultaneousU-TCI-UpdateList4 are list of serving cells for which the Unified TCI States Activation/Deactivation MAC CE applies simultaneously, as specified in [TS 38.321 v17.1.0 clause 6.1.3.47]. The different lists shall not contain same serving cells. Network only configures in these lists serving cells that are configured with unifiedtci-StateType.

When the bwp-id or cell for QCL-TypeA/D source RS in a QCL-Info of the TCI state configured with DLorJointT-CIState is not configured, the UE assumes that QCL-TypeA/D source RS is configured in the CC/DL BWP where TCI state applies.

When tci-PresentInDCI is set as 'enabled' or tci-PresentDCI-1-2 is configured for the CORESET, the UE with activated DLorJointTCIState or UL-TCIState receives DCI format 1_1/1_2 providing indicated DLorJointTCIState or UL-TCIState for a CC or all CCs in the same CC list configured by simultaneousTCI-UpdateList1-r17, simultaneousTCI-UpdateList2-r17, simultaneousTCI-UpdateList3-r17, simultaneousTCI-UpdateList4-r17. The DCI format 1_1/1_2 can be with or without, if applicable, DL assignment. If the DCI format 1_1/1_2/is without DL assignment, the UE can assume the following: (1) CS-RNTI is used to scramble the CRC for the DCI, (2) the values of the following DCI fields are set as follows: RV=all '1's, MCS=all '1's, NDI=0, and set to all '0's for FDRA Type 0, or all '1's for FDRA Type 1, or all '0's for dynamicSwitch (same as in Table 10.2-4 of [6, TS 38.213]).

After a UE receives an initial higher layer configuration of more than one DLorJoint-TCIState and before application of an indicated TCI state from the configured TCI states: the UE assumes that DM-RS of PDSCH and DM-RS of PDCCH and the CSI-RS applying the indicated TCI state are quasi co-located with the SS/PBCH block the UE identified during the initial access procedure.

After a UE receives an initial higher layer configuration of more than one DLorJoint-TCIState or UL-TCIState and before application of an indicated TCI state from the configured TCI states: the UE assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during the initial access procedure.

After a UE receives a higher layer configuration of more than one DLorJoint-TCIState as part of a Reconfiguration with sync procedure as described in [12, TS 38.331] and before applying an indicated TCI state from the configured TCI states: the UE assumes that DM-RS of PDSCH and DM-RS of PDCCH, and the CSI-RS applying the indicated TCI state are quasi co-located with the SS/PBCH block or the CSI-RS resource the UE identified during the random access procedure initiated by the Reconfiguration with sync procedure as described in [12, TS 38.331].

After a UE receives a higher layer configuration of more than one DLorJoint-TCIState or UL-TCIState as part of a Reconfiguration with sync procedure as described in [12, TS 38.331] and before applying an indicated TCI state from the configured TCI states: the UE assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during random access procedure initiated by the Reconfiguration with sync procedure as described in [12, TS 38.331].

If a UE receives a higher layer configuration of a single DLorJoint-TCIState, that can be used as an indicated TCI state, the UE obtains the QCL assumptions from the configured TCI state for DM-RS of PDSCH and DM-RS of PDCCH, and the CSI-RS applying the indicated TCI state.

If a UE receives a higher layer configuration of a single DLorJoint-TCIState or UL-TCIState, that can be used as an indicated TCI state, the UE determines an UL TX spatial filter, if applicable, from the configured TCI state for dynamic-grant and configured-grant based PUSCH and PUCCH, and SRS applying the indicated TCI state.

When the UE would transmit the last symbol of a PUCCH with HARQ-ACK information corresponding to the DCI carrying the TCI State indication and without DL assignment, or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamApp-Time_r17 symbols after the last symbol of the PUCCH. The first slot and the BeamAppTime_r17 symbols are both determined on the carrier with the smallest SCS among the carrier(s) applying the beam indication.

If a UE is configured with pdsch-TimeDomainAllocation-ListForMultiPDSCH-r17 in which one or more rows contain multiple SLIVs for PDSCH on a DL BWP of a serving cell, and the UE is receiving a DCI carrying the TCI-State indication and without DL assignment, the UE does not expect that the number of indicated SLIVs in the row of the pdsch-TimeDomainAllocationListForMultiPDSCH-r17 by the DCI is more than one.

If the UE is configured with NumberOfAdditionalPCI and with PDCCH-Config that contains two different values of coresetPoolIndex in ControlResourceSet, the UE receives an activation command for CORESET associated with each coresetPoolIndex, as described in clause 6.1.3.14 of [10, TS 38.321], used to map up to 8 TCI states to the codepoints of the DCI field 'Transmission Configuration Indication' in one CC/DL BWP. When a set of TCI state IDs are activated for a coresetPoolIndex, the activated TCI states corresponding to one coresetPoolIndex can be associated with one physical cell ID and activated TCI states corresponding to another coresetPoolIndex can be associated with another physical cell ID.

When a UE supports two TCI states in a codepoint of the DCI field 'Transmission Configuration Indication' the UE may receive an activation command, as described in clause 6.1.3.24 of [10, TS 38.321], the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in clause 6.1.3.14 and 6.1.3.24 of [10, TS38.321], only the first S activated codepoints are applied for DCI format 1_2.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $$n + 3N_{slot}^{subframe,\mu} + \frac{2^{\mu}}{2^{\mu_{K_{mac}}}}.$$

$k_{mac}$ where m is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}$=0 if K-Mac is not provided. If tci-PresentIn-DCI is set to 'enabled' or tci-PresentDCI-1-2 is configured for the CORESET scheduling the PDSCH, and the time offset between the reception of the DL DCI and the corresponding PDSCH is equal to or greater than timeDuration-ForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

If a UE is configured with the higher layer parameter tci-PresentInDCI that is set as 'enabled' for the CORESET scheduling a PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORE-SET. If the PDSCH is scheduled by a DCI format not having the TCI field present, and the time offset between the reception of the DL DCI and the corresponding PDSCH of a serving cell is equal to or greater than a threshold time-DurationForQCL if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

When a UE is configured with both sfnSchemePdcch and sfnSchemePdsch scheduled by DCI format 1_0 or by DCI format 1_1/1_2, if the time offset between the reception of the DL DCI and the corresponding PDSCH of a serving cell is equal to or greater than a threshold time DurationForQCL if applicable: if the UE supports DCI scheduling without TCI field, the UE assumes that the TCI state(s) or the QCL assumption(s) for the PDSCH is identical to the TCI state(s) or QCL assumption(s) whichever is applied for the CORE-SET used for the reception of the DL DCI within the active BWP of the serving cell regardless of the number of active TCI states of the CORESET. If the UE does not support dynamic switching between SFN PDSCH and non-SFN PDSCH, the UE should be activated with the CORESET with two TCI states; else if the UE does not support DCI scheduling without TCI field, the UE shall expect TCI field present when scheduled by DCI format 1_1/1_2.

When a UE is configured with sfnSchemePdsch and sfnSchemePdcch is not configured, when scheduled by DCI format 1_1/1_2, if the time offset between the reception of the DL DCI and the corresponding PDSCH of a serving cell is equal to or greater than a threshold time DurationForQCL if applicable, the UE shall expect TCI field present.

For PDSCH scheduled by DCI format 1_0, 1_1, 1_2, when a UE is configured with sfnSchemePdcch set to 'sfnSchemeA' and sfnSchemePdsch is not configured, and there is no TCI codepoint with two TCI states in the activation command, and if the time offset between the reception of the DL DCI and the corresponding PDSCH is equal or larger than the threshold timeDurationForQCL if applicable and the CORESET which schedules the PDSCH is indicated with two TCI states, the UE assumes that the TCI state or the QCL assumption for the PDSCH is identical to the first TCI state or QCL assumption which is applied for the CORESET used for the PDCCH transmission within the active BWP of the serving cell.

If a PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. For a single slot PDSCH, the indicated TCI state(s) should be based on the activated TCI states in the slot with the scheduled PDSCH. For a multi-slot PDSCH or the UE is configured with higher layer parameter pdsch-TimeDomainAllocationListForMultiPDSCH-r17, the indicated TCI state(s) should be based on the activated TCI states in the first slot with the scheduled PDSCH(s), and UE shall expect the activated TCI states are the same across the slots with the scheduled PDSCH(s). When the UE is configured with CORESET associated with a search space set for cross-carrier scheduling and the UE is not configured with enableDefaultBeamForCCS, the UE expects tci-PresentInDCI is set as 'enabled' or tci-PresentDCI-1-2 is configured for the CORESET, and if one or more of the TCI states configured for the serving cell scheduled by the search space set contains qcl-Type set to 'typeD', the UE expects the time offset between the reception of the detected PDCCH in the search space set and a corresponding PDSCH is larger than or equal to the threshold time DurationForQCL.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', If a UE is configured with enableDefaultTCI-StatePerCoreset-PoolIndex and the UE is configured by higher layer parameter PDCCH-Config that contains two different values of coresetPoolIndex in different ControlResourceSets, the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same value of coresetPoolIndex, the UE is expected to prioritize the reception of PDCCH associated with that CORESET. This also applies to the intra-band CA case (when PDSCH and the CORESET are in different component carriers).

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 in TS 38.214 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', if a UE is not configured with sfnSchemePdsch, and the UE is configured with sfnSchemePdcch set to 'sfnSchemeA' and there is no TCI codepoint with two TCI states in the activation command and the CORESET with the lowest ID in the latest slot is indicated with two TCI states, the UE may assume that the DM-RS ports of PDSCH of a serving cell are quasi co-located with the RS(s) with respect to the QCL parameter(s) associated with the first TCI state of two TCI states indicated for the CORESET.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', in all cases above, if none of configured TCI states for the serving cell of scheduled PDSCH is configured with qcl-Type set to 'typeD', the UE shall obtain the other QCL assumptions from the indicated TCI state(s) for its scheduled PDSCH irrespective of the time offset between the reception of the DL DCI and the corresponding PDSCH.

If the PDCCH carrying the scheduling DCI is received on one component carrier, and a PDSCH scheduled by that DCI is on another component carrier: (1) the timeDurationForQCL is determined based on the subcarrier spacing of the scheduled PDSCH. If $\mu_{PDCCH} < \mu_{PDSCH}$ an additional timing delay $$d\frac{2^{\mu_{PDSCH}}}{2^{\mu_{PDCCH}}}$$

is added to the timeDurationForQCL, where d is defined in 5.2.1.5.1a-1 in TS 38.214, otherwise d is zero; or (2) when the UE is configured with enableDefaultBeamForCCS, if the offset between the reception of the DL DCI and the corresponding PDSCH is less than the threshold timeDuration-ForQCL, or if the DL DCI does not have the TCI field present, the UE obtains its QCL assumption for the scheduled PDSCH from the activated TCI state with the lowest ID applicable to PDSCH in the active BWP of the scheduled cell.

A UE that has indicated a capability beamCorrespondenceWithoutUL-BeamSweeping set to '1', as described in [18, TS 38.822], can determine a spatial domain filter to be used while performing the applicable channel access procedures described in [16, TS 37.213] to transmit a UL transmission on the channel as follows: (1) if UE is indicated with an SRI corresponding to the UL transmission, the UE may use a spatial domain filter that is same as the spatial domain transmission filter associated with the indicated SRI, or (2) if UE is configured with TCI-State configurations with DLorJointTCIState or UL-TCIState, the UE may use a spatial domain transmit filter that is same as the spatial domain receive filter the UE may use to receive the DL reference signal associated with the indicated TCI state.

When the PDCCH reception includes two PDCCH from two respective search space sets, as described in clause 10.1 of [6, TS 38.213], for the purpose of determining the time offset between the reception of the DL DCI and the corresponding PDSCH, the PDCCH candidate that ends later in time is used. When the PDCCH reception includes two PDCCH candidates from two respective search space sets, as described in clause 10.1 of [6, TS 38.213], for the configuration of tci-PresentInDCI or tci-PresentDCI-1-2, the UE expects the same configuration in the first and second CORESETs associated with the two PDCCH candidates; and if the PDSCH is scheduled by a DCI format not having the TCI field present and if the scheduling offset is equal to or larger than timeDurationForQCL, if applicable, PDSCH QCL assumption is based on the CORESET with lower ID among the first and second CORESETs associated with the two PDCCH candidates.

For a periodic CSI-RS resource in an NZP-CSI-RS-ResourceSet configured with higher layer parameter trs-Info, the UE shall expect that a TCI-State indicates one of the following quasi co-location type(s): (1) 'typeC' with an SS/PBCH block and, when applicable, 'typeD' with the same SS/PBCH block, or (2) 'typeC' with an SS/PBCH block and, when applicable, 'typeD' with a CSI-RS resource in an NZP-CSI-RS-ResourceSet configured with higher layer parameter repetition.

For periodic/semi-persistent CSI-RS, the UE can assume that the indicated DLorJointTCIState is not applied.

For an aperiodic CSI-RS resource in an NZP-CSI-RS-ResourceSet configured with higher layer parameter trs-Info, the UE shall expect that a TCI-State indicates qcl-Type set to 'typeA' with a periodic CSI-RS resource in a NZP-CSI-RS-ResourceSet configured with higher layer parameter trs-Info and, when applicable, qcl-Type set to 'typeD' with the same periodic CSI-RS resource.

For a CSI-RS resource in an NZP-CSI-RS-ResourceSet configured without higher layer parameter trs-Info and without the higher layer parameter repetition, the UE shall expect that a TCI-State indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, (2) 'typeA' with a CSI-RS resource in a NZP-CSI-RS-ResourceSet configured with higher layer parameter trs-Info and, when applicable, 'typeD' with an SS/PBCH block, (3) 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or (4) 'typeB' with a CSI-RS resource in a NZP-CSI-RS-ResourceSet configured with higher layer parameter trs-Info when 'typeD' is not applicable.

For a CSI-RS resource in an NZP-CSI-RS-ResourceSet configured with higher layer parameter repetition, the UE shall expect that a TCI-State indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, (2) 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, (3) 'typeC' with an SS/PBCH block and, when applicable, 'typeD' with the same SS/PBCH block, the reference RS may additionally be an SS/PBCH block having a PCI different from the PCI of the serving cell. The UE can assume center frequency, SCS, SFN offset are the same for SS/PBCH block from the serving cell and SS/PBCH block having a PCI different from the serving cell.

For the DM-RS of PDCCH, the UE shall expect that a TCI-State or DLorJointTCIState except an indicated DLorJointTCIState indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, (2) 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or (3) 'typeA' with a CSI-RS resource in a NZP-CSI-RS-ResourceSet configured without higher layer parameter trs-Info and without higher layer parameter repetition and, when applicable, 'typeD' with the same CSI-RS resource.

When a UE is configured with sfnSchemePdcch set to 'sfnSchemeA', and CORESET is activated with two TCI states, the UE shall assume that the DM-RS port(s) of the PDCCH in the CORESET is quasi co-located with the DL-RSs of the two TCI states. When a UE is configured with sfnSchemePdcch set to 'sfnSchemeB', and a CORESET is activated with two TCI states, the UE shall assume that the DM-RS port(s) of the PDCCH is quasi co-located with the DL-RSs of the two TCI states except for quasi co-location parameters {Doppler shift, Doppler spread} of the second indicated TCI state.

For the DM-RS of PDSCH, the UE shall expect that a TCI-State or DLorJointTCIState except an indicated DLorJointTCIState indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, (2) 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or (3) 'typeA' with a CSI-RS resource in a NZP-CSI-RS-ResourceSet configured without higher layer parameter trs-Info and without higher layer parameter repetition and, when applicable, 'typeD' with the same CSI-RS resource.

For the DM-RS of PDCCH, the UE shall expect that an indicated DLorJointTCIState indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, or (2) 'typeA' with a CSI-RS resource in a NZP-CSI-RS-ResourceSet config-ured with higher layer parameter trs-Info and, when appli-cable, 'typeD' with a CSI-RS resource in an NZP-CSI-RS-ResourceSet configured with higher layer parameter repetition.

For the DM-RS of PDSCH, the UE shall expect that an indicated DLorJointTCIState indicates one of the following quasi co-location type(s) if the UE is configured TCI-State (s) with tci-StateId_r17: (1) 'typeA' with a CSI-RS resource in a NZP-CSI-RS-ResourceSet configured with higher layer parameter trs-Info and, when applicable, 'typeD' with the same CSI-RS resource, or (2) 'typeA' with a CSI-RS resource in a NZP-CSI-RS-ResourceSet configured with higher layer parameter trs-Info and, when applicable, 'typeD' with a CSI-RS resource in an NZP-CSI-RS-Re-sourceSet configured with higher layer parameter repetition.

When a UE is configured with sfnSchemePdsch set to 'sfnSchemeA', and the UE is indicated with two TCI states in a codepoint of the DCI field 'Transmission Configuration Indication' in a DCI scheduling a PDSCH, the UE shall assume that the DM-RS port(s) of the PDSCH is quasi co-located with the DL-RSs of the two TCI states. When a UE is configured with sfnSchemePdsch set to 'sfn-SchemeB', and the UE is indicated with two TCI states in a codepoint of the DCI field 'Transmission Configuration Indication' in a DCI scheduling a PDSCH, the UE shall assume that the DM-RS port(s) of the PDSCH is quasi co-located with the DL-RSs of the two TCI states except for quasi co-location parameters {Doppler shift, Doppler spread} of the second indicated TCI state.

Throughout the present disclosure, the joint (e.g., pro-vided by DLorJoint-TCIState), separate DL (e.g., provided by DLorJoint-TCIState) and/or separate UL (e.g., provided by UL-TCIState) TCI states described/discussed herein could also be referred to as unified TCI states, common TCI states, main TCI states and etc.

A UE can be provided, for each BWP of a serving cell, a set $\bar{q}_0$ of periodic CSI-RS resource configuration indexes by failureDetectionResourcesToAddModList and a set $\bar{q}_1$ of periodic CSI-RS resource configuration indexes and/or SS/PBCH block indexes by candidateBeamRSList or can-didateBeamRSListExt or candidateBeamRSSCellList for radio link quality measurements on the BWP of the serving cell. In the present disclosure, in a single-TRP system or for single-TRP operation, a BFD RS (beam) set could corre-spond to the set $\bar{q}_0$ described herein, and a NBI RS (beam) set could correspond to the set $\hat{q}_1$ described herein.

Instead of the sets $\bar{q}_0$ and $\bar{q}_1$, for each BWP of a serving cell, the UE can be provided respective two sets $\bar{q}_{0,0}$ and $\bar{q}_{0,1}$ of periodic CSI-RS resource configuration indexes that can be activated by a MAC CE [11 TS 38.321] and correspond-ing two sets $\bar{q}_{1,0}$ and $\bar{q}_{1,1}$ of periodic CSI-RS resource configuration indexes and/or SS/PBCH block indexes by candidateBeamRSList1 and candidateBeamRSList2, respectively, for radio link quality measurements on the BWP of the serving cell. The set $\bar{q}_{0,0}$ is associated with the set $\bar{q}_{1,0}$ and the set $\bar{q}_{0,1}$ is associated with the set $\bar{q}_{1,1}$. In the present disclosure, in a multi-TRP system or for multi-TRP operation, the UE can be provided a BFD RS (beam) set p, where $p \in \{1, 2, \ldots, N\}$ and N denotes the total number of BFD RS (beam) sets configured/provided to the UE. For this case, the first BFD RS set or BFD RS set 1 (e.g., p=1) could correspond to the set $\bar{q}_{0,0}$ described herein, and the second BFD RS set or BFD RS set 2 (e.g., p=2) could correspond to the set $\bar{q}_{0,1}$ described herein. In addition, the UE can be provided a NBI RS (beam) set p', where $p' \in \{1, 2, \ldots, M\}$ and M denotes the total number of NBI RS (beam) sets configured/provided to the UE. For this case, the first NBI RS set or NBI RS set 1 (e.g., p'=1) could correspond to the set $\bar{q}_{1,0}$ described herein, and the second NBI RS set or NBI RS set 2 (e.g., p'=2) could correspond to the set $\bar{q}_{1,1}$ described herein.

If the UE is not provided $\bar{q}_0$ by failureDetectionRe-sourcesToAddModList for a BWP of the serving cell, the UE determines the set $\bar{q}_0$ to include periodic CSI-RS resource configuration indexes with same values as the RS indexes in the RS sets indicated by TCI-State for respective CORE-SETs that the UE uses for monitoring PDCCH. If the UE is not provided $\bar{q}_{0,0}$ or $\bar{q}_{0,1}$ for a BWP of the serving cell, the UE determines the set $\bar{q}_{0,0}$ or $\bar{q}_{0,1}$ to include periodic CSI-RS resource configuration indexes with same values as the RS indexes in the RS sets indicated by TCI-State for first and second CORESETs that the UE uses for monitoring PDCCH, where the UE is provided two coresetPoolIndex values 0 and 1 for the first and second CORESETs, or is not provided coresetPoolIndex value for the first CORESETs and is provided coresetPoolIndex value of 1 for the second CORESETs, respectively. If there are two RS indexes in a TCI state, the set $\bar{q}_0$ or $\bar{q}_{0,0}$, or $\bar{q}_{0,1}$ includes RS indexes configured with qcl-Type set to 'typeD' for the correspond-ing TCI states. In the present disclosure, in a single-TRP system or for single-TRP operation, a BFD RS (beam) set could correspond to the set $\bar{q}_0$ described herein, and a NBI RS (beam) set could correspond to the set $\bar{q}_1$ described herein. In the present disclosure, in a multi-TRP system or for multi-TRP operation, the UE can be provided a BFD RS (beam) set p, where $p \in \{1, 2, \ldots, N\}$ and N denotes the total number of BFD RS (beam) sets configured/provided to the UE. For this case, the first BFD RS set or BFD RS set 1 (e.g., p=1) could correspond to the set $\bar{q}_{0,0}$ described herein, and the second BFD RS set or BFD RS set 2 (e.g., p=2) could correspond to the set $\bar{q}_{0,1}$ described herein. In addition, the UE can be provided a NBI RS (beam) set p', where $p' \in \{1, 2, \ldots, M\}$ and M denotes the total number of NBI RS (beam) sets configured/provided to the UE. For this case, the first NBI RS set or NBI RS set 1 (e.g., p'=1) could corre-spond to the set $\bar{q}_{1,0}$ described herein, and the second NBI RS set or NBI RS set 2 (e.g., p'=2) could correspond to the set $\bar{q}_{1,1}$ described herein.

If a CORESET that the UE uses for monitoring PDCCH includes two TCI states and the UE is provided sfn-SchemePdcch set to 'sfnSchemeA' or 'sfnSchemeB', the set $\bar{q}_0$ includes RS indexes in the RS sets associated with the two TCI states. The UE expects the set $\bar{q}_0$ to include up to two RS indexes. If the UE is provided $\bar{q}_{0,0}$ or $\bar{q}_{0,1}$, the UE expects the set $\bar{q}_{0,0}$ or the set $\bar{q}_{0,1}$ to include up to a number of $N_{BFD}$ RS indexes indicated by capabilityparametername. If the UE is not provided $\bar{q}_{0,0}$ or $\bar{q}_{0,1}$, and if a number of active TCI states for PDCCH receptions in the first or second CORE-SETs is larger than $N_{BFD}$, the UE determines the set $\bar{q}_{0,0}$ or $\bar{q}_{0,1}$ to include periodic CSI-RS resource configuration indexes with same values as the RS indexes in the RS sets associated with the active TCI states for PDCCH receptions in the first or second CORESETs corresponding to search space sets according to an ascending order for monitoring periodicity. If more than one first or second CORESETs correspond to search space sets with same monitoring periodicity, the UE determines the order of the first or second CORESETs according to a descending order of a CORESET index.

If a UE is not provided coresetPoolIndex or is provided coresetPoolIndex with a value of 0 for first CORESETs on an active DL BWP of a serving cell, and/or the UE is provided coresetPoolIndex with a value of 1 for second CORESETs on the active DL BWP of the serving cells, and/or the UE is provided SSB-MTCAdditionalPCI, SS/PBCH block indexes associated with a physical cell identity other than the one provided by physCellId in ServingCellConfigCommon can be provided in either $\bar{q}_{1,0}$ or $\bar{q}_{1,1}$ set and the corresponding $\bar{q}_{0,0}$ or $\bar{q}_{0,1}$ set is associated with the physical cell identity.

The UE expects single port RS in the set $\bar{q}_0$, or $\bar{q}_{0,0}$, or $\bar{q}_{0,1}$. The UE expects single-port or two-port CSI-RS with frequency density equal to 1 or 3 REs per RB in the set $\bar{q}_1$, or $\bar{q}_{1,0}$, or $\bar{q}_{1,1}$. The thresholds $Q_{out,LR}$ and $Q_{in,LR}$ correspond to the default value of rlmInSyncOutOfSyncThreshold, as described in [10, TS 38.133] for $Q_{out}$, and to the value provided by rsrp-ThresholdSSB or rsrp-ThresholdBFR, respectively.

The physical layer in the UE assesses the radio link quality according to the set $\bar{q}_0$, $\bar{q}_{0,0}$, or $\bar{q}_{0,1}$, of resource configurations against the threshold $Q_{out,LR}$. For the set $\bar{q}_0$, the UE assesses the radio link quality only according to SS/PBCH blocks on the PCell or the PSCell or periodic CSI-RS resource configurations that are quasi co-located, as described in [6, TS 38.214], with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by powerControlOffsetSS.

In non-DRX mode operation, the physical layer in the UE provides an indication to higher layers when the radio link quality for all corresponding resource configurations in the set $\bar{q}_0$, or in the set $\bar{q}_{0,0}$ or $\bar{q}_{0,1}$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity among the SS/PBCH blocks on the PCell or the PSCell and/or the periodic CSI-RS configurations in the set $\bar{q}_0$, $\bar{q}_{0,0}$ or $\bar{q}_{0,1}$ that the UE uses to assess the radio link quality and 2 msec. In DRX mode operation, the physical layer provides an indication to higher layers when the radio link quality is worse than the threshold $Q_{out,LR}$ with a periodicity determined as described in [10, TS 38.133].

For the PCell or the PSCell, upon request from higher layers, the UE provides to higher layers the periodic CSI-RS configuration indexes and/or SS/PBCH block indexes from the set $\bar{q}_1$, or $\bar{q}_{1,0}$, or $\bar{q}_{1,1}$ and the corresponding L1-RSRP measurements that are larger than or equal to the $Q_{in,LR}$ threshold.

For the SCell, upon request from higher layers, the UE indicates to higher layers whether there is at least one periodic CSI-RS configuration index or SS/PBCH block index from the set $\bar{q}_1$, or $\bar{q}_{1,0}$, or $\bar{q}_{1,1}$ with corresponding L1-RSRP measurements that is larger than or equal to the $Q_{in,LR}$ threshold, and provides the periodic CSI-RS configuration indexes and/or SS/PBCH block indexes from the set $\bar{q}_1$, or $\bar{q}_{1,0}$, or $\bar{q}_{1,1}$ and the corresponding L1-RSRP measurements that are larger than or equal to the Qin, LR threshold, if any.

For the PCell or the PSCell, a UE can be provided a CORESET through a link to a search space set provided by recoverySearchSpaceId, as described in clause 10.1, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

For the PCell or the PSCell, the UE can be provided, by PRACH-ResourceDedicatedBFR, a configuration for PRACH transmission as described in clause 8.1. For PRACH transmission in slot n and according to antenna port quasi co-location parameters associated with periodic CSI-RS resource configuration or with SS/PBCH block associated with index $q_{new}$ provided by higher layers [11, TS 38.321], the UE monitors PDCCH in a search space set provided by recoverySearchSpaceId for detection of a DCI format with CRC scrambled by C-RNTI or MCS-C-RNTI starting from slot $n+4+2^{\mu} \cdot k_{mac}$, where u is the SCS configuration for the PRACH transmission and $k_{mac}$ is a number of slots provided by K-Mac [12, TS 38.331] or $k_{mac}=0$ if K-Mac is not provided, within a window configured by BeamFailureRecoveryConfig. For PDCCH monitoring in a search space set provided by recoverySearchSpaceId and for corresponding PDSCH reception, the UE assumes the same antenna port quasi-collocation parameters as the ones associated with index $q_{new}$ until the UE receives by higher layers an activation for a TCI state or any of the parameters tci-StatesPDCCH-ToAddList and/or tci-StatesPDCCH-ToReleaseList. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state or tci-StatesPDCCH-ToAddList and/or tci-StatesPDCCH-ToReleaseList.

In a wireless communications system, a radio link failure (RLF) could occur if a significant/sudden link quality drop is observed at the UE side. If a RLF occurs, fast RLF recovery mechanisms, therefore, become essential to promptly re-establish the communication link(s) and avoid severe service interruption. At higher frequencies, e.g., millimeter-wave (mmWave) frequencies or FR2 in the 3GPP NR, both the transmitter and receiver could use directional (analog) beams to transmit and receive various RSs/channels such as SSBs, CSI-RSs, PDCCHs or PDSCHs. Hence, prior to declaring a full RLF, the UE could first detect and recover a potential beam failure if the signal qualities/strengths of certain beam pair links (BPLs) are below a certain threshold for a certain period of time.

Figures 8, 9:
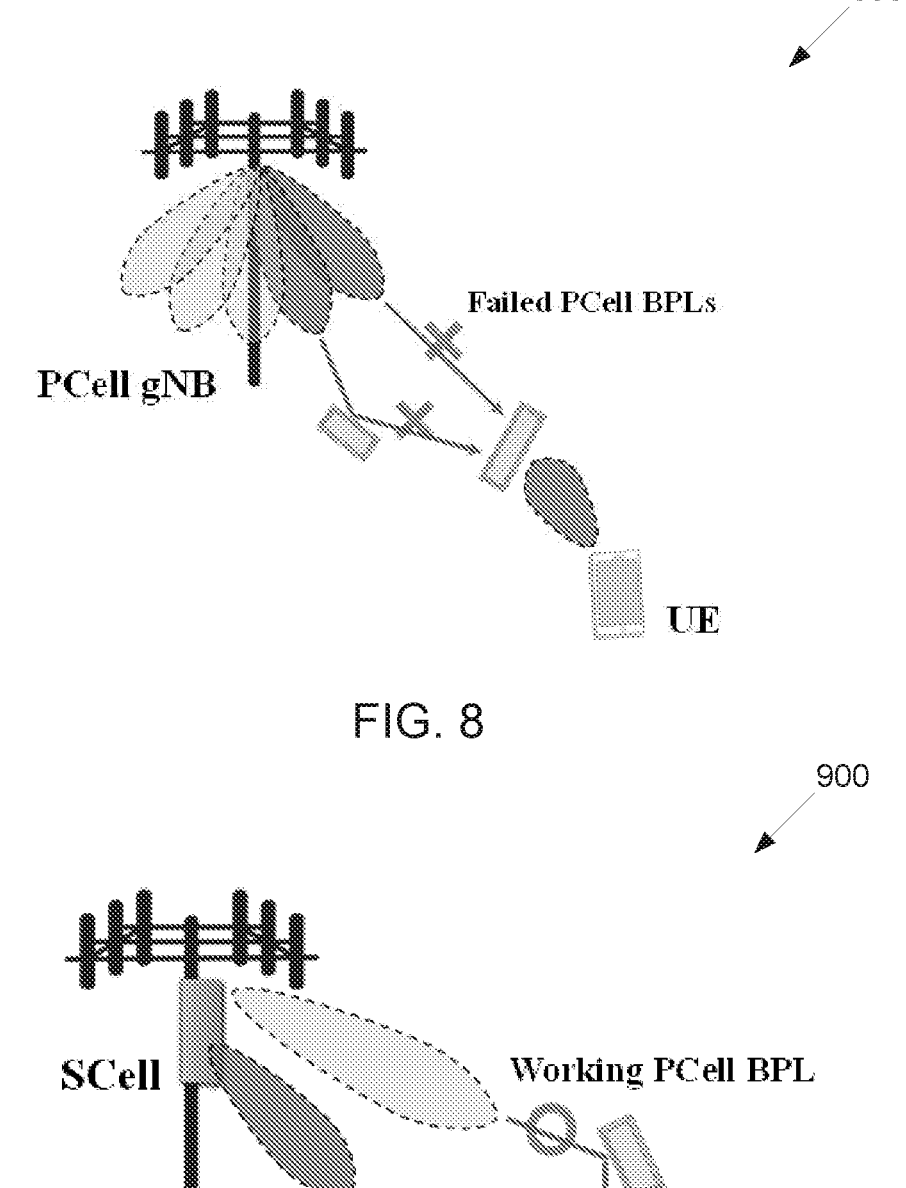
FIG. 8 illustrates an example of beam failure recovery (BFR) procedure for a PCell or PSCell according to embodiments of the present disclosure.
FIG. 9 illustrates an example of SCell beam failure according to embodiments of the present disclosure.
Figures 10, 11:
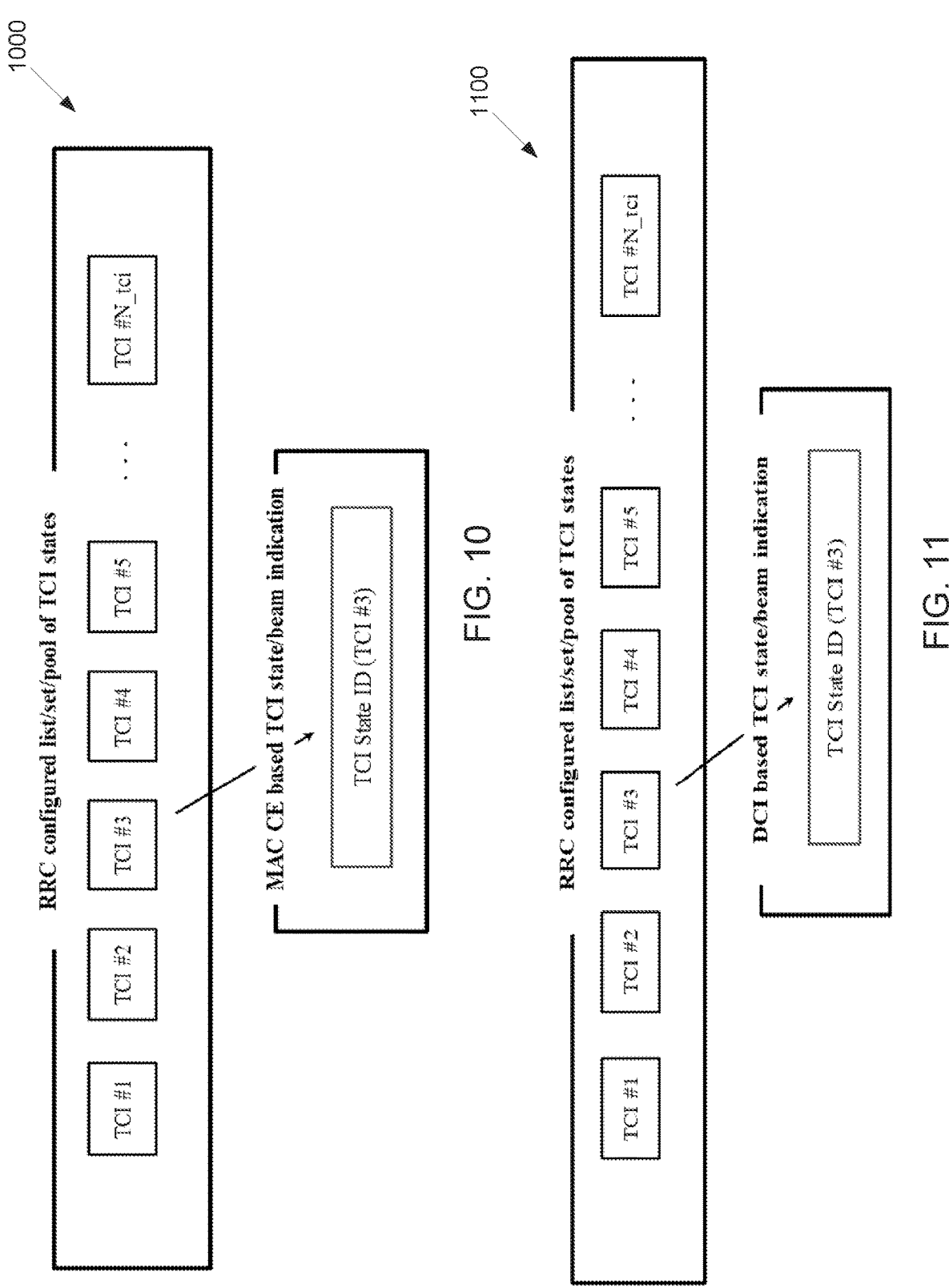
FIG. 10 illustrates an example of MAC CE based TCI state/beam indication according to embodiments of the present disclosure.
FIG. 11 illustrates an example of DCI based common TCI state/beam indication according to embodiments of the present disclosure.
Figure 12:
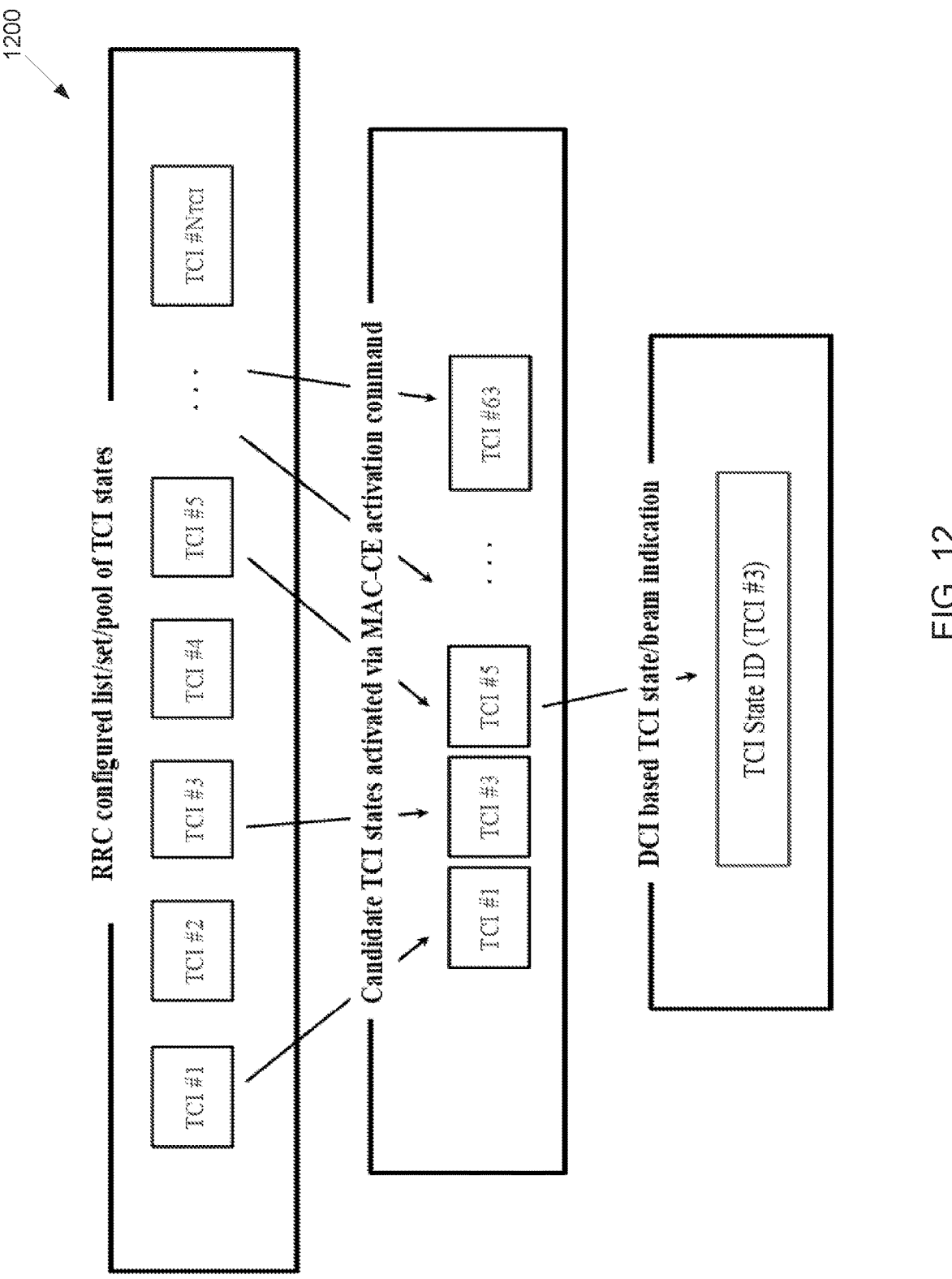
FIG. 12 illustrates another example of DCI based common TCI state/beam indication with MAC CE activated TCI states according to embodiments of the present disclosure.

FIG. 8 illustrates an example of BFR procedure 800 for a PCell or PSCell according to embodiments of the present disclosure. An embodiment of the BFR procedure 800 shown in FIG. 8 is for illustration only.

The 3GPP Rel. 15 BFR procedure mainly targets for a primary cell (PCell or PSCell) under the carrier aggregation (CA) framework as shown in FIG. 8. The BFR procedure in the 3GPP Rel. 15 comprises the following key components: (1) beam failure detection (BFD); (2) new beam identification (NBI); (3) BFR request (BFRQ); and/or (4) BFRQ response (BFRR).

The UE is first configured by the gNB a set of BFD RS resources to monitor the link qualities between the gNB and the UE. One BFD RS resource could correspond to one (periodic) CSI-RS/SSB RS resource, which could be a quasi-co-located (QCL) source RS with typeD in a TCI state for a CORESET. If the received signal qualities of all the BFD RS resources are below a given threshold (implying that the hypothetical BLERs of the corresponding CORE-SETs/PDCCHs are above a given threshold), the UE could declare a beam failure instance (BFI). Furthermore, if the UE has declared N_BFI consecutive BFIs within a given time period, the UE may declare a beam failure.

After declaring/detecting the beam failure, the UE may transmit the BFRQ to the gNB via a contention-free (CF) PRACH (CF BFR-PRACH) resource, whose index is associated with a new beam identified by the UE. Specifically, to determine a potential new beam, the UE could be first configured by the network a set of SSB and/or CSI-RS resources (NBI RS resources) via a higher layer parameter candidateBeamRSList. The UE may then measure the NBI RSs and calculate their L1-RSRPs. If at least one of the measured L1-RSRPs of the NBI RSs is beyond a given threshold, the UE may select the beam that corresponds to the NBI RS with the highest L1-RSRP as the new beam q_new.

To determine a CF BFR-PRACH resource to convey the BFRQ, the UE could be first configured by the network a set of PRACH resources, each associated with a NBI RS resource. The UE could then select the PRACH resource that has the one-to-one correspondence to the selected NBI RS resource (and therefore, the new beam index q_new) to send the BFRQ to the gNB. From the index of the selected CF PRACH resource, the gNB could also know which beam is selected by the UE as the new beam.

Four slots after the UE has transmitted the BFRQ, the UE could start to monitor a dedicated CORESET/search space for BFRQ response. The dedicated CORESET is addressed to the UE-specific C-RNTI, and may be transmitted by the gNB using the newly identified beam. If the UE detects a valid UE-specific DCI in the dedicated CORESET for BFRR, the UE may assume that the beam failure recovery request has been successfully received by the network, and the UE may complete the BFR process. Otherwise, if the UE does not receive the BFRR within a configured time window, the UE may initiate a contention based (CB) random access (RA) process to reconnect to the network.

FIG. 9 illustrates an example of SCell beam failure 900 according to embodiments of the present disclosure. An embodiment of the SCell beam failure 900 shown in FIG. 9 is for illustration only.

In the 3GPP Rel. 16, the BFR procedures were customized for the secondary cell (SCell) under the CA framework, in which the BPL(s) between the PCell and the UE is assumed to be always working. An illustrative example of the SCell beam failure is given in FIG. 9.

After declaring/detecting the beam failure for the SCell, the UE may transmit the BFRQ in form of a scheduling request (SR) over a PUCCH for the working PCell. Furthermore, the UE could only transmit the BFRQ at this stage without indicating any new beam index, failed SCell index or other information to the network. This is different from the Rel. 15 PCell/PSCell procedure, in which the UE may indicate both the BFRQ and the identified new beam index to the network at the same time. Allowing the gNB to quickly know the beam failure status of the SCell without waiting for the UE to identify a new beam could be beneficial. For instance, the gNB could deactivate the failed SCell and allocate the resources to other working SCells.

The UE could be indicated by the network an uplink grant in response to the BFRQ SR, which may allocate necessary resources for the MAC CE to carry new beam index q_new (if identified), failed SCell index and etc. over the PUSCH for the working PCell. After transmitting the MAC CE for BFR to the working PCell, the UE may start to monitor the BFRR. The BFRR could be a TCI state indication for a CORESET for the corresponding SCell. The BFRR to the MAC CE for BFR could also be a normal uplink grant for scheduling a new transmission for the same HARQ process as the PUSCH carrying the MAC CE for BFR. If the UE could not receive the BFRR within a configured time window, the UE could transmit BFR-PUCCH again, or fall back to CBRA process.

As mentioned herein, in the current 3GPP Rel. 15/16 based BFR designs, the UE could be explicitly configured by the network (via higher layer RRC signaling) one or more BFD RS resources to measure. Alternatively, the UE could implicitly determine the one or more BFD RS resources as the QCL source RS(s) indicated in active TCI state(s) for PDCCH reception(s) in one or more CORESET(s). Under the Rel. 17 unified TCI framework, a UE could be provided by the network a joint DL and UL TCI state or separate DL or UL TCI state via MAC CE or DCI (DCI format 1_1 or 1_2 with or without DL assignment) based signaling. Hence, under the Rel. 17 unified TCI framework, various design aspects related to configuring/determining the BFD RS resources for DL or UL beam detection/declaration need to be specified.

The present disclosure provides various design aspects for BFD RS configuration and beam failure declaration following the unified TCI framework specified in Rel. 17, wherein a UE can be provided by the network a joint DL and UL TCI state or separate DL or UL TCI state via MAC CE or DCI (DCI format 1_1 or 1_2 with or without DL assignment) based signaling.

As described in the U.S. patent application Ser. No. 17/584,239, which is incorporated by reference in its entirety, a unified TCI framework could indicate/include N≥1 DL TCI states and/or M≥1 UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/associated TCI state ID; and/or (4) separate DL TCI state and UL TCI state and/or their corresponding/associated TCI state ID(s).

There could be various design options/channels to indicate to the UE a beam (i.e., a TCI state) for the transmission/reception of a PDCCH or a PDSCH as described in the U.S. patent application Ser. No. 17/584,239, which is incorporated by reference in its entirety.

In one example, a MAC CE could be used to indicate to the UE a beam (i.e., a TCI state and/or a TCI state ID) for the transmission/reception of a PDCCH or a PDSCH.

In another example, a DCI could be used to indicate to the UE a beam (i.e., a TCI state and/or a TCI state ID) for the transmission/reception of a PDCCH or a PDSCH.

In one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

In another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

the UE could determine/configure the BFD RS set q0 following the QCL assumptions indicated in joint DL and UL TCI state or separate DL or UL TCI state (e.g., provided by higher layer parameter TCI-State-r17) for DL or UL beam failure detection.

In one example, the UE could implicitly determine/configure a first BFD RS set q0_1 to include periodic CSI-RS resource configuration indexes or SSB indexes (also referred to as BFD RS resource indexes) with same values as the RS indexes in the RS sets indicated in one or more joint DL and UL TCI states provided by the higher layer parameter TCI-State-r17 for respective CORESETs that the UE uses for monitoring PDCCH. The UE could be indicated by the network the joint DL and UL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals.

In another example, the UE could implicitly determine/configure a second BFD RS set q0_2 to include periodic CSI-RS resource configuration indexes or SSB indexes (also referred to as BFD RS resource indexes) with same values as the RS indexes in the RS sets indicated in one or more separate DL TCI states provided by the higher layer parameter TCI-State-r17 for respective CORESETs that the UE uses for monitoring PDCCH. The UE could be indicated by the network the separate DL TCI state via MAC CE or DCI (e.g., DCI format 1_1 or 1_2 with or without DL assignment) based signaling, wherein the separate DL TCI state can be used at least for UE-dedicated DL channels/signals.

In yet another example, the UE could implicitly determine/configure a third BFD RS set q0_3 to include periodic CSI-RS resource configuration indexes or SSB indexes (also referred to as BFD RS resource indexes) with same values as the RS indexes in the RS sets indicated in one or more separate UL TCI states provided by the higher layer parameter TCI-State-r17 for respective PUCCHs. The UE could be indicated by the network the separate UL TCI state via MAC CE or DCI (e.g., DCI format 1_1 or 1_2 with or without DL assignment) based signaling, wherein the separate UL TCI state can be used at least for UE-dedicated UL channels/signals.

In yet another example, the UE could implicitly determine/configure a fourth BFD RS set q0_4 to include periodic CSI-RS resource configuration indexes or SSB indexes (also referred to as BFD RS resource indexes) with same values as the RS indexes in the RS sets indicated in one or more joint DL and UL TCI states and one or more separate DL TCI states provided by the higher layer parameter TCI-State-r17 for respective CORESETs that the UE uses for monitoring PDCCH. The UE could be indicated by the network the joint DL and UL TCI state and/or separate DL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals, and the separate DL TCI state can be used at least for UE-dedicated DL channels/signals.

In yet another example, the UE could implicitly determine/configure a fifth BFD RS set q0_5 to include periodic CSI-RS resource configuration indexes or SSB indexes (also referred to as BFD RS resource indexes) with same values as the RS indexes in the RS sets indicated in one or more joint DL and UL TCI states provided by the higher layer parameter TCI-State-r17 for respective CORESETs that the UE uses for monitoring PDCCH and one or more separate UL TCI states provided by the higher layer parameter TCI-State-r17 for respective PUCCHs. The UE could be indicated by the network the joint DL and UL TCI state and/or separate UL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals, and the separate UL TCI state can be used at least for UE-dedicated UL channels/signals.

In yet another example, the UE could implicitly determine/configure a sixth BFD RS set q0_6 to include periodic CSI-RS resource configuration indexes or SSB indexes (also referred to as BFD RS resource indexes) with same values as the RS indexes in the RS sets indicated in one or more separate DL TCI states provided by the higher layer parameter TCI-State-r17 for respective CORESETs that the UE uses for monitoring PDCCH and one or more separate UL TCI states provided by the higher layer parameter TCI-State-r17 for respective PUCCHs. The UE could be indicated by the network the separate DL TCI state and/or separate UL TCI state via MAC CE or DCI (e.g., DCI format 1_1 or 1_2 with or without DL assignment) based signaling, wherein the separate DL TCI state can be used at least for UE-dedicated DL channels/signals, and the separate UL TCI state can be used at least for UE-dedicated UL channels/signals.

In yet another example 1.7, the UE could implicitly determine/configure a seventh BFD RS set q0_7 to include periodic CSI-RS resource configuration indexes or SSB indexes (also referred to as BFD RS resource indexes) with same values as the RS indexes in the RS sets indicated in one or more joint DL and UL TCI states, one or more separate DL TCI states provided by the higher layer parameter TCI-State-r17 for respective CORESETs that the UE uses for monitoring PDCCH, and one or more separate UL TCI states provided by the higher layer parameter TCI-State-r17 for respective PUCCHs. The UE could be indicated by the network the joint DL and UL TCI state and/or separate DL TCI state and/or separate UL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals, the separate DL TCI state can be used at least for UE-dedicated DL channels/signals, and the separate UL TCI state can be used at least for UE-dedicated UL channels/signals.

As discussed in the present disclosure, the UE could be higher layer RRC configured by the network, e.g., provided by the higher layer parameter failureDetectionResourcesToAddModList, a BFD RS set q0 of periodic CSI-RS resource configuration indexes or SSB indexes for beam/link failure detection or declaration. Under the Rel. 15/16 TCI framework, the UE assesses the radio link quality of the BFD RS set q0 only according to SSBs on the PCell or the PSCell or periodic CSI-RS resource configurations that are quasi co-located (i.e., QCLed) with the DM-RS of PDCCH receptions monitored by the UE. Under the Rel. 17 unified TCI framework, the UE could assess the radio link quality of the BFD RS set according to SSBs on the PCell or the PSCell or periodic CSI-RS resource configurations that are indicated in joint DL and UL TCI state(s) or separate DL or UL TCI state(s).

In one example, the UE could be higher layer RRC configured by the network, e.g., provided by the higher layer parameter failureDetectionResourcesToAddModList1, a first BFD RS set q0_1 of periodic CSI-RS resource configuration indexes or SSB indexes. The UE assesses the radio link quality of the BFD RS set q0_1 only according to SSB indexes on the PCell or the PSCell or periodic CSI-RS resource configuration indexes with same values as the RS indexes in the RS sets indicated in one or more joint DL and UL TCI states provided by the higher layer parameter TCI-State-r17 for respective CORESETs that the UE uses for monitoring PDCCH against the BFD threshold Qout. Furthermore, the physical layer in the UE provides an indication to higher layers when the radio link quality for all corresponding periodic CSI-RS resource configuration indexes or SSB indexes in the first BFD RS set q0_1 that have same values as the RS indexes in the RS sets indicated in the joint DL and UL TCI state(s) is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the first BFD RS set q0_1 that the UE uses to assess the radio link quality and 2 msec, or a periodicity determined by the maximum between the shortest periodicity among the SSBs on the PCell or the PSCell and/or the periodic CSI-RS configurations in the first BFD RS set q0_1 whose indexes have same values as the RS indexes in the RS sets indicated in the joint DL and UL TCI state(s) and 2 msec. The UE could be indicated by the network the joint DL and UL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals.

In another example, the UE could be higher layer RRC configured by the network, e.g., provided by the higher layer parameter failureDetectionResourcesToAddModList2, a second BFD RS set q0_2 of periodic CSI-RS resource configuration indexes or SSB indexes. The UE assesses the radio link quality of the BFD RS set q0_2 only according to SSB indexes on the PCell or the PSCell or periodic CSI-RS resource configuration indexes with same values as the RS indexes in the RS sets indicated in one or more separate DL TCI states provided by the higher layer parameter TCI-State-r17 for respective CORESETs that the UE uses for monitoring PDCCH against the BFD threshold Qout.

Furthermore, the physical layer in the UE provides an indication to higher layers when the radio link quality for all corresponding periodic CSI-RS resource configuration indexes or SSB indexes in the second BFD RS set q0_2 that have same values as the RS indexes in the RS sets indicated in the separate DL TCI state(s) is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the second BFD RS set q0_2 that the UE uses to assess the radio link quality and 2 msec, or a periodicity determined by the maximum between the shortest periodicity among the SSBs on the PCell or the PSCell and/or the periodic CSI-RS configurations in the second BFD RS set q0_2 whose indexes have same values as the RS indexes in the RS sets indicated in the separate DL TCI state(s) and 2 msec. The UE could be indicated by the network the separate DL TCI state via MAC CE or DCI (e.g., DCI format 1_1 or 1_2 with or without DL assignment) based signaling, wherein the separate DL TCI state can be used at least for UE-dedicated DL channels/signals.

In yet another example, the UE could be higher layer RRC configured by the network, e.g., provided by the higher layer parameter failureDetectionResourcesToAddModList3, a third BFD RS set q0_3 of periodic CSI-RS resource configuration indexes or SSB indexes. The UE assesses the radio link quality of the BFD RS set q0_3 only according to SSB indexes on the PCell or the PSCell or periodic CSI-RS resource configuration indexes with same values as the RS indexes in the RS sets indicated in one or more separate UL TCI states provided by the higher layer parameter TCI-State-r17 for respective PUCCHs against the BFD threshold Qout.

Furthermore, the physical layer in the UE provides an indication to higher layers when the radio link quality for all corresponding periodic CSI-RS resource configuration indexes or SSB indexes in the third BFD RS set q0_3 that have same values as the RS indexes in the RS sets indicated in the separate UL TCI state(s) is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the third BFD RS set q0_3 that the UE uses to assess the radio link quality and 2 msec, or a periodicity determined by the maximum between the shortest periodicity among the SSBs on the PCell or the PSCell and/or the periodic CSI-RS configurations in the third BFD RS set q0_3 whose indexes have same values as the RS indexes in the RS sets indicated in the separate UL TCI state(s) and 2 msec. The UE could be indicated by the network the separate UL TCI state via MAC CE or DCI (e.g., DCI format 1_1 or 1_2 with or without DL assignment) based signaling, wherein the separate UL TCI state can be used at least for UE-dedicated UL channels/signals.

In yet another example, the UE could be higher layer RRC configured by the network, e.g., provided by the higher layer parameter failureDetectionResourcesToAddModList, a master/main BFD RS set q0 of periodic CSI-RS resource configuration indexes or SSB indexes.

In one example, the UE assesses the radio link quality of one or more SSB indexes on the PCell or the PSCell or periodic CSI-RS resource configuration indexes in the master/main BFD RS set q0 with same values as the RS indexes in the RS sets indicated in one or more joint DL and UL TCI states provided by the higher layer parameter TCI-State-r17 for respective CORESETs that the UE uses for monitoring PDCCH against the BFD threshold Qout.

Furthermore, the physical layer in the UE provides an indication to higher layers when the radio link quality for all corresponding periodic CSI-RS resource configuration indexes or SSB indexes in the master/main BFD RS set q0 that have same values as the RS indexes in the RS sets indicated in the joint DL and UL TCI state(s) is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the master/main BFD RS set q0 that the UE uses to assess the radio link quality and 2 msec, or a periodicity determined by the maximum between the shortest periodicity among the SSBs on the PCell or the PSCell and/or the periodic CSI-RS configurations in the master/main BFD RS set q0 whose indexes have same values as the RS indexes in the RS sets indicated in the joint DL and UL TCI state(s) and 2 msec.

The UE could be indicated by the network the joint DL and UL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals.

In another example, the UE assesses the radio link quality of one or more SSB indexes on the PCell or the PSCell or periodic CSI-RS resource configuration indexes in the master/main BFD RS set q0 with same values as the RS indexes in the RS sets indicated in one or more separate DL TCI states provided by the higher layer parameter TCI-State-r17 for respective CORESETs that the UE uses for monitoring PDCCH against the BFD threshold Qout. Furthermore, the physical layer in the UE provides an indication to higher layers when the radio link quality for all corresponding periodic CSI-RS resource configuration indexes or SSB indexes in the master/main BFD RS set q0 that have same values as the RS indexes in the RS sets indicated in the separate DL TCI state(s) is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the master/main BFD RS set q0 that the UE uses to assess the radio link quality and 2 msec, or a periodicity determined by the maximum between the shortest periodicity among the SSBs on the PCell or the PSCell and/or the periodic CSI-RS configurations in the master/main BFD RS set q0 whose indexes have same values as the RS indexes in the RS sets indicated in the separate DL TCI state(s) and 2 msec. The UE could be indicated by the network the separate DL TCI state via MAC CE or DCI (e.g., DCI format 1_1 or 1_2 with or without DL assignment) based signaling, wherein the separate DL TCI state can be used at least for UE-dedicated DL channels/signals.

In yet another example, the UE assesses the radio link quality of one or more SSB indexes on the PCell or the PSCell or periodic CSI-RS resource configuration indexes in the master/main BFD RS set q0 with same values as the RS indexes in the RS sets indicated in one or more separate UL TCI states provided by the higher layer parameter TCI-State-r17 for respective PUCCHs against the BFD threshold Qout. Furthermore, the physical layer in the UE provides an indication to higher layers when the radio link quality for all corresponding periodic CSI-RS resource configuration indexes or SSB indexes in the master/main BFD RS set q0 that have same values as the RS indexes in the RS sets indicated in the separate UL TCI state(s) is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the master/main BFD RS set q0 that the UE uses to assess the radio link quality and 2 msec, or a periodicity determined by the maximum between the shortest periodicity among the SSBs on the PCell or the PSCell and/or the periodic CSI-RS configurations in the master/main BFD RS set q0 whose indexes have same values as the RS indexes in the RS sets indicated in the separate UL TCI state(s) and 2 msec. The UE could be indicated by the network the separate UL TCI state via MAC CE or DCI (e.g., DCI format 1_1 or 1_2 with or without DL assignment) based signaling, wherein the separate UL TCI state can be used at least for UE-dedicated UL channels/signals.

In yet another example, the UE assesses the radio link quality of one or more SSB indexes on the PCell or the PSCell or periodic CSI-RS resource configuration indexes in the master/main BFD RS set q0 with same values as the RS indexes in the RS sets indicated in one or more joint DL and UL TCI states provided by the higher layer parameter TCI-State-r17 for respective CORESETs that the UE uses for monitoring PDCCH, and one or more SSB indexes on the PCell or the PSCell or periodic CSI-RS resource configuration indexes in the master/main BFD RS set q0 with same values as the RS indexes in the RS sets indicated in one or more separate DL TCI states provided by the higher layer parameter TCI-State-r17 for respective CORESETs that the UE uses for monitoring PDCCH against the BFD threshold Qout.

Furthermore, the physical layer in the UE provides an indication to higher layers when the radio link quality for all corresponding periodic CSI-RS resource configuration indexes or SSB indexes in the master/main BFD RS set q0 that have same values as the RS indexes in the RS sets indicated in the joint DL and UL TCI state(s) and separate DL TCI state(s) is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the master/main BFD RS set q0 that the UE uses to assess the radio link quality and 2 msec, or a periodicity determined by the maximum between the shortest periodicity among the SSBs on the PCell or the PSCell and/or the periodic CSI-RS configurations in the master/main BFD RS set q0 whose indexes have same values as the RS indexes in the RS sets indicated in the joint DL and UL TCI state(s) and separate DL TCI state(s) and 2 msec.

The UE could be indicated by the network the joint DL and UL TCI state and/or separate DL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals, and the separate DL TCI state can be used at least for UE-dedicated DL channels/signals.

In yet another example, the UE assesses the radio link quality of one or more SSB indexes on the PCell or the PSCell or periodic CSI-RS resource configuration indexes in the master/main BFD RS set q0 with same values as the RS indexes in the RS sets indicated in one or more joint DL and UL TCI states provided by the higher layer parameter TCI-State-r17 for respective CORESETs that the UE uses for monitoring PDCCH, and one or more SSB indexes on the PCell or the PSCell or periodic CSI-RS resource configuration indexes in the master/main BFD RS set q0 with same values as the RS indexes in the RS sets indicated in one or more separate UL TCI states provided by the higher layer parameter TCI-State-r17 for respective PUCCHs against the BFD threshold Qout.

Furthermore, the physical layer in the UE provides an indication to higher layers when the radio link quality for all corresponding periodic CSI-RS resource configuration indexes or SSB indexes in the master/main BFD RS set q0 that have same values as the RS indexes in the RS sets indicated in the joint DL and UL TCI state(s) and separate UL TCI state(s) is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the master/main BFD RS set q0 that the UE uses to assess the radio link quality and 2 msec, or a periodicity determined by the maximum between the shortest periodicity among the SSBs on the PCell or the PSCell and/or the periodic CSI-RS configurations in the master/main BFD RS set q0 whose indexes have same values as the RS indexes in the RS sets indicated in the joint DL and UL TCI state(s) and separate UL TCI state(s) and 2 msec.

The UE could be indicated by the network the joint DL and UL TCI state and/or separate UL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals, and the separate UL TCI state can be used at least for UE-dedicated UL channels/signals.

In yet another example, the UE assesses the radio link quality of one or more SSB indexes on the PCell or the PSCell or periodic CSI-RS resource configuration indexes in the master/main BFD RS set q0 with same values as the RS indexes in the RS sets indicated in one or more separate DL TCI states provided by the higher layer parameter TCI-State-r17 for respective CORESETs that the UE uses for monitoring PDCCH, and one or more SSB indexes on the PCell or the PSCell or periodic CSI-RS resource configuration indexes in the master/main BFD RS set q0 with same values as the RS indexes in the RS sets indicated in one or more separate UL TCI states provided by the higher layer parameter TCI-State-r17 for respective PUCCHs against the BFD threshold Qout.

Furthermore, the physical layer in the UE provides an indication to higher layers when the radio link quality for all corresponding periodic CSI-RS resource configuration indexes or SSB indexes in the master/main BFD RS set q0 that have same values as the RS indexes in the RS sets indicated in the separate DL TCI state(s) and separate UL TCI state(s) is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the master/main BFD RS set q0 that the UE uses to assess the radio link quality and 2 msec, or a periodicity determined by the maximum between the shortest periodicity among the SSBs on the PCell or the PSCell and/or the periodic CSI-RS configurations in the master/main BFD RS set q0 whose indexes have same values as the RS indexes in the RS sets indicated in the separate DL TCI state(s) and separate UL TCI state(s) and 2 msec.

The UE could be indicated by the network the separate DL TCI state and/or separate UL TCI state via MAC CE or DCI (e.g., DCI format 1_1 or 1_2 with or without DL assignment) based signaling, wherein the separate DL TCI state can be used at least for UE-dedicated DL channels/signals, and the separate UL TCI state can be used at least for UE-dedicated UL channels/signals.

In yet another example, the UE assesses the radio link quality of one or more SSB indexes on the PCell or the PSCell or periodic CSI-RS resource configuration indexes in the master/main BFD RS set q0 with same values as the RS indexes in the RS sets indicated in one or more joint DL and UL TCI states provided by the higher layer parameter TCI-State-r17 for respective CORESETs that the UE uses for monitoring PDCCH, one or more SSB indexes on the PCell or the PSCell or periodic CSI-RS resource configuration indexes in the master/main BFD RS set q0 with same values as the RS indexes in the RS sets indicated in one or more separate DL TCI states provided by the higher layer parameter TCI-State-r17 for respective CORESETs that the UE uses for monitoring PDCCH, and one or more SSB indexes on the PCell or the PSCell or periodic CSI-RS resource configuration indexes in the master/main BFD RS set q0 with same values as the RS indexes in the RS sets indicated in one or more separate UL TCI states provided by the higher layer parameter TCI-State-r17 for respective PUCCHs against the BFD threshold Qout.

Furthermore, the physical layer in the UE provides an indication to higher layers when the radio link quality for all corresponding periodic CSI-RS resource configuration indexes or SSB indexes in the master/main BFD RS set q0 that have same values as the RS indexes in the RS sets indicated in the joint DL and UL TCI state(s), separate DL TCI state(s) and separate UL TCI state(s) is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the master/main BFD RS set q0 that the UE uses to assess the radio link quality and 2 msec, or a periodicity determined by the maximum between the shortest periodicity among the SSBs on the PCell or the PSCell and/or the periodic CSI-RS configurations in the master/main BFD RS set q0 whose indexes have same values as the RS indexes in the RS sets indicated in the joint DL and UL TCI state(s), separate DL TCI state(s) and separate UL TCI state(s) and 2 msec.

The UE could be indicated by the network the joint DL and UL TCI state and/or separate DL TCI state and/or separate UL TCI state via MAC CE or DCI (e.g., DCI format 1_1 or 1_2 with or without DL assignment) based signaling, wherein the joint DL and UL TCI state can be used at least for UE-dedicated DL channels/signals and UE-dedicated UL channels/signals, the separate DL TCI state can be used at least for UE-dedicated DL channels/signals, and the separate UL TCI state can be used at least for UE-dedicated UL channels/signals.

As described herein in the present disclosure, a UE could be provided/indicated/configured by the network, e.g., in a unified TCI state activation/indication MAC CE and/or beam indication DCI (e.g., via one or more TCI codepoints of one or more TCI fields in DCI format 1_1/1_2 with or without DL assignment), N>1 or M>1 (e.g., N=2 or M=2) unified TCI states/pairs of TCI states for UE dedicated control and data channels/signals for both DL and UL, wherein each indicated unified TCI state could be a joint DL and UL TCI state or a separate DL TCI state provided by DLorJoint-TCIState or a separate UL TCI state provided by UL-TCIState. For this case, the BFD RS(s) in the BFD RS set(s) as specified herein in the present disclosure—denoted by the n'-th (or m'-th) BFD RS set or BFD RS set n' (or m')—could be determined/derived/configured according to the n-th (or m-th) indicated unified TCI state/pair of unified TCI states among all the indicated N>1 or M>1 unified TCI states/pairs of TCI states, wherein $n' \in \{1, \ldots, N\}$, $n \in \{1, \ldots, N\}$, $m' \in \{1, \ldots, M\}$ and $m \in \{1, \ldots, M\}$. In the present disclosure, (1) the relationship between n' and n (or between m' and m) could be fixed in the system specifications; e.g., $n'=n$ (or $m'=m$), where for N=2 (or M=2), n'=n=1,2 (or m'=m=1,2), and/or (2) the UE could be configured/indicated/provided by the network, e.g., via higher layer RRC signaling/parameter and/or MAC CE command and/or dynamic DCI based L1 signaling, the value(s) of n', n, m' or m.

As described herein in the present disclosure, a UE could be provided by the network, e.g., via PDCCH-Config, two values (e.g., 0 and 1) of CORESET pool index, in ControlResourceSet. The UE could be provided/indicated/configured by the network, e.g., in a unified TCI state activation/indication MAC CE associated/configured with a CORESET pool index value (e.g., 0 or 1) and a beam indication DCI associated/configured with a CORESET pool index value (e.g., 0 or 1), one or more (e.g., N=1 or M=1) unified TCI states/pairs of TCI states for UE dedicated control and data channels/signals for both DL and UL associated/configured with the same value of CORESET pool index, wherein the beam indication DCI could be received in CORESET(s) configured with a value of CORESET pool index, the one or more unified TCI states/pairs of TCI states could be associated with the same value of CORESET pool index, and each indicated unified TCI state could be a joint DL and UL TCI state or a separate DL TCI state provided by DLorJoint-TCIState or a separate UL TCI state provided by UL-TCIState. For this case, the BFD RS(s) in the BFD RS set(s) as specified herein in the present disclosure—denoted by the n'-th (or m'-th) BFD RS set or BFD RS set n' (or m')—could be determined/derived/configured according to the indicated unified TCI state(s)/pair(s) of unified TCI states associated to value n−1 (or m−1) of CORESET pool index, wherein n'∈{1,2}, n∈{1,2}, m'∈{1, 2} and m∈{1,2}. In the present disclosure, (1) the relationship between n' and n (or between m' and m) could be fixed in the system specifications; e.g., n'=n=1 or 2 (or m'=m=1 or 2), and/or (2) the UE could be configured/indicated/provided by the network, e.g., via higher layer RRC signaling/parameter and/or MAC CE command and/or dynamic DCI based L1 signaling, the value(s) of n', n, m' or m.

In Rel. 15/16, the physical layer in the UE assesses the radio link quality according to the BFD RS set q0 of resource configurations against the BFD threshold Qout. Furthermore, the physical layer in the UE provides an indication to higher layers when the radio link quality for all corresponding resource configurations in the BFD RS set q0 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0 that the UE uses to assess the radio link quality and 2 msec.

Under the Rel. 17 unified TCI framework, for the implicit BFD RS configuration, following examples can be provided.

In one example, the physical layer in the UE assesses the radio link quality according to the first BFD RS set q0_1 of resource configurations against the BFD threshold Qout. Furthermore, the physical layer in the UE provides an indication to higher layers when the radio link quality for all corresponding resource configurations in the first BFD RS set q0_1 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the first BFD RS set q0_1 that the UE uses to assess the radio link quality and 2 msec.

The higher layers in the UE may increment the BFI count (by one) in a first BFI counter (denoted by BFI_ COUNTER_1) if the higher layers receive from the physical layer in the UE that the radio link quality of the first BFD RS set q0_1 is worse than Qout. The UE may declare a DL and/or UL beam failure for the first BFD RS set q0_1 if the BFI count in the first BFI counter BFI_COUNTER_1 for the first BFD RS set q0_1 reaches the maximum number of BFI counts (e.g., provided by the higher layer parameter maxBFIcount) before a first BFD timer expires. After the higher layers in the UE declare DL and/or UL beam failure for the first BFD RS set q0_1, the higher layers in the UE may reset the BFI count in the first BFI counter BFI_COUNTER_1 or the first BFD timer to zero.

In one example, the physical layer in the UE assesses the radio link quality according to the second BFD RS set q0_2 of resource configurations against the BFD threshold Qout. Furthermore, the physical layer in the UE provides an indication to higher layers when the radio link quality for all corresponding resource configurations in the second BFD RS set q0_2 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the second BFD RS set q0_2 that the UE uses to assess the radio link quality and 2 msec.

The higher layers in the UE may increment the BFI count (by one) in a second BFI counter (denoted by BFI_ COUNTER_2) if the higher layers receive from the physical layer in the UE that the radio link quality of the second BFD RS set q0_2 is worse than Qout. The UE may declare a DL beam failure for the second BFD RS set q0_2 if the BFI count in the second BFI counter BFI_COUNTER_2 for the second BFD RS set q0_2 reaches the maximum number of BFI counts (e.g., provided by the higher layer parameter maxBFIcount) before a second BFD timer expires. After the higher layers in the UE declare DL beam failure for the second BFD RS set q0_2, the higher layers in the UE may reset the BFI count in the second BFI counter BFI_ COUNTER_2 or the second BFD timer to zero.

In one example, the physical layer in the UE assesses the radio link quality according to the third BFD RS set q0_3 of resource configurations against the BFD threshold Qout. Furthermore, the physical layer in the UE provides an indication to higher layers when the radio link quality for all corresponding resource configurations in the third BFD RS set q0_3 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the third BFD RS set q0_3 that the UE uses to assess the radio link quality and 2 msec.

The higher layers in the UE may increment the BFI count (by one) in a third BFI counter (denoted by BFI_ COUNTER_3) if the higher layers receive from the physical layer in the UE that the radio link quality of the third BFD RS set q0_3 is worse than Qout. The UE may declare an UL beam failure for the third BFD RS set q0_3 if the BFI count in the third BFI counter BFI_COUNTER_3 for the third BFD RS set q0_3 reaches the maximum number of BFI counts (e.g., provided by the higher layer parameter maxB- FIcount) before a third BFD timer expires. After the higher layers in the UE declare UL beam failure for the third BFD RS set q0_3, the higher layers in the UE may reset the BFI count in the third BFI counter BFI_COUNTER_3 or the third BFD timer to zero.

In one example, the physical layer in the UE assesses the radio link quality according to the fourth BFD RS set q0_4 of resource configurations against the BFD threshold Qout. Furthermore, the physical layer in the UE provides an indication to higher layers when the radio link quality for all corresponding resource configurations in the fourth BFD RS set q0_4 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the fourth BFD RS set q0_4 that the UE uses to assess the radio link quality and 2 msec.

The higher layers in the UE may increment the BFI count (by one) in a first fourth BFI counter (denoted by BFI_COUNTER_4-1) if the higher layers receive from the physical layer in the UE that the radio link quality of the fourth BFD RS set q0_4 is worse than Qout. The UE may declare a DL and/or UL beam failure for the fourth BFD RS set q0_4 if the BFI count in the first fourth BFI counter BFI_COUNTER_4-1 for the fourth BFD RS set q0_4 reaches the maximum number of BFI counts (e.g., provided by the higher layer parameter maxBFIcount) before a first fourth BFD timer expires. After the higher layers in the UE declare DL and/or UL beam failure for the fourth BFD RS set q0_4, the higher layers in the UE may reset the BFI count in the first fourth BFI counter BFI_COUNTER_4-1 or the first fourth BFD timer to zero.

In another example, the physical layer in the UE assesses the radio link quality according to resource configurations indicated in the joint DL and UL TCI state(s) in the fourth BFD RS set q0_4 against the BFD threshold Qout. Furthermore, the physical layer in the UE provides an indication to higher layers when the radio link quality for all corresponding resource configurations indicated in the joint DL and UL TCI state(s) in the fourth BFD RS set q0_4 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the fourth BFD RS set q0_4 that the UE uses to assess the radio link quality and 2 msec, or a periodicity determined by the maximum between the shortest periodicity among the SSBs on the PCell or the PSCell and/or the periodic CSI-RS configurations indicated in the joint DL and UL TCI state(s) in the fourth BFD RS set q0_4 that the UE uses to assess the radio link quality and 2 msec.

The higher layers in the UE may increment the BFI count (by one) in a second fourth BFI counter (denoted by BFI_COUNTER_4-2) if the higher layers receive from the physical layer in the UE that the radio link quality of resource configurations indicated in the joint DL and UL TCI state(s) in the fourth BFD RS set q0_4 is worse than Qout. The UE may declare a DL and/or UL beam failure for the fourth BFD RS set q0_4 if the BFI count in the second fourth BFI counter BFI_COUNTER_4-2 for the fourth BFD RS set q0_4 reaches the maximum number of BFI counts (e.g., provided by the higher layer parameter maxBFIcount)

before a second fourth BFD timer expires. After the higher layers in the UE declare DL and/or UL beam failure for the fourth BFD RS set q0_4 according to the resource configurations indicated in the joint DL and UL TCI state(s), the higher layers in the UE may reset the BFI count in the second fourth BFI counter BFI_COUNTER_4-2 or the second fourth BFD timer to zero.

In yet another example, the physical layer in the UE assesses the radio link quality according to resource configurations indicated in the separate DL TCI state(s) in the fourth BFD RS set q0_4 against the BFD threshold Qout. Furthermore, the physical layer in the UE provides an indication to higher layers when the radio link quality for all corresponding resource configurations indicated in the separate DL TCI state(s) in the fourth BFD RS set q0_4 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the fourth BFD RS set q0_4 that the UE uses to assess the radio link quality and 2 msec, or a periodicity determined by the maximum between the shortest periodicity among the SSBs on the PCell or the PSCell and/or the periodic CSI-RS configurations indicated in the separate DL TCI state(s) in the fourth BFD RS set q0_4 that the UE uses to assess the radio link quality and 2 msec.

The higher layers in the UE may increment the BFI count (by one) in a third fourth BFI counter (denoted by BFI_COUNTER_4-3) if the higher layers receive from the physical layer in the UE that the radio link quality of resource configurations indicated in the separate DL TCI state(s) in the fourth BFD RS set q0_4 is worse than Qout. The UE may declare a DL beam failure for the fourth BFD RS set q0_4 if the BFI count in the third fourth BFI counter BFI_COUNTER_4-3 for the fourth BFD RS set q0_4 reaches the maximum number of BFI counts (e.g., provided by the higher layer parameter maxBFIcount) before a third fourth BFD timer expires. After the higher layers in the UE declare DL beam failure for the fourth BFD RS set q0_4 according to the resource configurations indicated in the separate DL TCI state(s), the higher layers in the UE may reset the BFI count in the third fourth BFI counter BFI_COUNTER_4-3 or the third fourth BFD timer to zero.

In one example, the physical layer in the UE assesses the radio link quality according to the fifth BFD RS set q0_5 of resource configurations against the BFD threshold Qout. Furthermore, the physical layer in the UE provides an indication to higher layers when the radio link quality for all corresponding resource configurations in the fifth BFD RS set q0_5 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the fifth BFD RS set q0_5 that the UE uses to assess the radio link quality and 2 msec.

The higher layers in the UE may increment the BFI count (by one) in a first fifth BFI counter (denoted by BFI_COUNTER_5-1) if the higher layers receive from the physical layer in the UE that the radio link quality of the fifth BFD RS set q0_5 is worse than Qout. The UE may declare a DL and/or UL beam failure for the fifth BFD RS set q0_5 if the BFI count in the first fifth BFI counter BFI_COUNTER_5-1 for the fifth BFD RS set q0_5 reaches the maximum number of BFI counts (e.g., provided by the higher layer parameter maxBFIcount) before a first fifth BFD timer expires. After the higher layers in the UE declare DL and/or UL beam failure for the fifth BFD RS set q0_5, the higher layers in the UE may reset the BFI count in the first fifth BFI counter BFI_COUNTER_5-1 or the first fifth BFD timer to zero.

In another example, the physical layer in the UE assesses the radio link quality according to resource configurations indicated in the joint DL and UL TCI state(s) in the fifth BFD RS set q0_5 against the BFD threshold Qout. Furthermore, the physical layer in the UE provides an indication to higher layers when the radio link quality for all corresponding resource configurations indicated in the joint DL and UL TCI state(s) in the fifth BFD RS set q0_5 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the fifth BFD RS set q0_5 that the UE uses to assess the radio link quality and 2 msec, or a periodicity determined by the maximum between the shortest periodicity among the SSBs on the PCell or the PSCell and/or the periodic CSI-RS configurations indicated in the joint DL and UL TCI state(s) in the fifth BFD RS set q0_5 that the UE uses to assess the radio link quality and 2 msec.

The higher layers in the UE may increment the BFI count (by one) in a second fifth BFI counter (denoted by BFI_COUNTER_5-2) if the higher layers receive from the physical layer in the UE that the radio link quality of resource configurations indicated in the joint DL and UL TCI state(s) in the fifth BFD RS set q0_5 is worse than Qout. The UE may declare a DL and/or UL beam failure for the fifth BFD RS set q0_5 if the BFI count in the second fifth BFI counter BFI_COUNTER_5-2 for the fifth BFD RS set q0_5 reaches the maximum number of BFI counts (e.g., provided by the higher layer parameter maxBFIcount) before a second fifth BFD timer expires. After the higher layers in the UE declare DL and/or UL beam failure for the fifth BFD RS set q0_5 according to the resource configurations indicated in the joint DL and UL TCI state(s), the higher layers in the UE may reset the BFI count in the second fifth BFI counter BFI_COUNTER_5-2 or the second fifth BFD timer to zero.

In yet another example, the physical layer in the UE assesses the radio link quality according to resource configurations indicated in the separate UL TCI state(s) in the fifth BFD RS set q0_5 against the BFD threshold Qout. Furthermore, the physical layer in the UE provides an indication to higher layers when the radio link quality for all corresponding resource configurations indicated in the separate UL TCI state(s) in the fifth BFD RS set q0_5 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the fifth BFD RS set q0_5 that the UE uses to assess the radio link quality and 2 msec, or a periodicity determined by the maximum between the shortest periodicity among the SSBs on the PCell or the PSCell and/or the periodic CSI-RS configurations indicated in the separate UL TCI state(s) in the fifth BFD RS set q0_5 that the UE uses to assess the radio link quality and 2 msec.

The higher layers in the UE may increment the BFI count (by one) in a third fifth BFI counter (denoted by BFI_COUNTER_5-3) if the higher layers receive from the physical layer in the UE that the radio link quality of resource configurations indicated in the separate UL TCI state(s) in the fifth BFD RS set q0_5 is worse than Qout. The UE may declare an UL beam failure for the fifth BFD RS set q0_5 if the BFI count in the third fifth BFI counter BFI_ COUN-TER_5-3 for the fifth BFD RS set q0_5 reaches the maximum number of BFI counts (e.g., provided by the higher layer parameter maxBFIcount) before a third fifth BFD timer expires. After the higher layers in the UE declare UL beam failure for the fifth BFD RS set q0_5 according to the resource configurations indicated in the separate UL TCI state(s), the higher layers in the UE may reset the BFI count in the third fifth BFI counter BFI_COUNTER_5-3 or the third fifth BFD timer to zero.

In one example, the physical layer in the UE assesses the radio link quality according to the sixth BFD RS set q0_6 of resource configurations against the BFD threshold Qout. Furthermore, the physical layer in the UE provides an indication to higher layers when the radio link quality for all corresponding resource configurations in the sixth BFD RS set q0_6 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the sixth BFD RS set q0_6 that the UE uses to assess the radio link quality and 2 msec. The higher layers in the UE may increment the BFI count (by one) in a first sixth BFI counter (denoted by BFI_COUNTER_6-1) if the higher layers receive from the physical layer in the UE that the radio link quality of the sixth BFD RS set q0_6 is worse than Qout. The UE may declare a DL and/or UL beam failure for the sixth BFD RS set q0_6 if the BFI count in the first sixth BFI counter BFI_COUNTER_6-1 for the sixth BFD RS set q0_6 reaches the maximum number of BFI counts (e.g., provided by the higher layer parameter maxBFIcount) before a first sixth BFD timer expires. After the higher layers in the UE declare DL and/or UL beam failure for the sixth BFD RS set q0_6, the higher layers in the UE may reset the BFI count in the first sixth BFI counter BFI_COUNTER_6-1 or the first sixth BFD timer to zero.

In another example, the physical layer in the UE assesses the radio link quality according to resource configurations indicated in the separate DL TCI state(s) in the sixth BFD RS set q0_6 against the BFD threshold Qout. Furthermore, the physical layer in the UE provides an indication to higher layers when the radio link quality for all corresponding resource configurations indicated in the separate DL TCI state(s) in the sixth BFD RS set q0_6 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the sixth BFD RS set q0_6 that the UE uses to assess the radio link quality and 2 msec, or a periodicity determined by the maximum between the shortest periodicity among the SSBs on the PCell or the PSCell and/or the periodic CSI-RS configurations indicated in the separate DL TCI state(s) in the sixth BFD RS set q0_6 that the UE uses to assess the radio link quality and 2 msec.

The higher layers in the UE may increment the BFI count (by one) in a second sixth BFI counter (denoted by BFI_COUNTER_6-2) if the higher layers receive from the physical layer in the UE that the radio link quality of resource configurations indicated in the separate DL TCI state(s) in the sixth BFD RS set q0_6 is worse than Qout. The UE may declare a DL beam failure for the sixth BFD RS set q0_6 if the BFI count in the second sixth BFI counter BFI_COUNTER_6-2 for the sixth BFD RS set q0_6 reaches the maximum number of BFI counts (e.g., provided by the higher layer parameter maxBFIcount) before a second sixth BFD timer expires. After the higher layers in the UE declare DL beam failure for the sixth BFD RS set q0_6 according to the resource configurations indicated in the separate DL TCI state(s), the higher layers in the UE may reset the BFI count in the second sixth BFI counter BFI_COUNTER_6-2 or the second sixth BFD timer to zero.

In yet another example, the physical layer in the UE assesses the radio link quality according to resource configurations indicated in the separate UL TCI state(s) in the sixth BFD RS set q0_6 against the BFD threshold Qout.

Furthermore, the physical layer in the UE provides an indication to higher layers when the radio link quality for all corresponding resource configurations indicated in the separate UL TCI state(s) in the sixth BFD RS set q0_6 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the sixth BFD RS set q0_5 that the UE uses to assess the radio link quality and 2 msec, or a periodicity determined by the maximum between the shortest periodicity among the SSBs on the PCell or the PSCell and/or the periodic CSI-RS configurations indicated in the separate UL TCI state(s) in the sixth BFD RS set q0_6 that the UE uses to assess the radio link quality and 2 msec.

The higher layers in the UE may increment the BFI count (by one) in a third sixth BFI counter (denoted by BFI_COUNTER_6-3) if the higher layers receive from the physical layer in the UE that the radio link quality of resource configurations indicated in the separate UL TCI state(s) in the sixth BFD RS set q0_6 is worse than Qout. The UE may declare an UL beam failure for the sixth BFD RS set q0_6 if the BFI count in the third sixth BFI counter BFI_COUNTER_6-3 for the sixth BFD RS set q0_6 reaches the maximum number of BFI counts (e.g., provided by the higher layer parameter maxBFIcount) before a third sixth BFD timer expires. After the higher layers in the UE declare UL beam failure for the sixth BFD RS set q0_6 according to the resource configurations indicated in the separate UL TCI state(s), the higher layers in the UE may reset the BFI count in the third sixth BFI counter BFI_COUNTER_6-3 or the third sixth BFD timer to zero.

In one example, the physical layer in the UE assesses the radio link quality according to the seventh BFD RS set q0_7 of resource configurations against the BFD threshold Qout. Furthermore, the physical layer in the UE provides an indication to higher layers when the radio link quality for all corresponding resource configurations in the seventh BFD RS set q0_7 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the seventh BFD RS set q0_7 that the UE uses to assess the radio link quality and 2 msec.

The higher layers in the UE may increment the BFI count (by one) in a first seventh BFI counter (denoted by BFI_COUNTER_7-1) if the higher layers receive from the physical layer in the UE that the radio link quality of the seventh BFD RS set q0_7 is worse than Qout. The UE may declare a DL and/or UL beam failure for the seventh BFD RS set q0_7 if the BFI count in the first seventh BFI counter BFI_COUNTER_7-1 for the seventh BFD RS set q0_7 reaches the maximum number of BFI counts (e.g., provided by the higher layer parameter maxBFIcount) before a first seventh BFD timer expires. After the higher layers in the UE declare DL and/or UL beam failure for the seventh BFD RS set q0_7, the higher layers in the UE may reset the BFI count in the first seventh BFI counter BFI_COUNTER_7-1 or the first seventh BFD timer to zero.

In another example, the physical layer in the UE assesses the radio link quality according to resource configurations indicated in the joint DL and UL TCI state(s) and separate DL TCI state(s) in the seventh BFD RS set q0_7 against the BFD threshold Qout.

Furthermore, the physical layer in the UE provides an indication to higher layers when the radio link quality for all corresponding resource configurations indicated in the joint DL and UL TCI state(s) and separate DL TCI state(s) in the seventh BFD RS set q0_7 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the seventh BFD RS set q0_7 that the UE uses to assess the radio link quality and 2 msec, or a periodicity determined by the maximum between the shortest periodicity among the SSBs on the PCell or the PSCell and/or the periodic CSI-RS configurations indicated in the joint DL and UL TCI state(s) and separate DL TCI state(s) in the seventh BFD RS set q0_7 that the UE uses to assess the radio link quality and 2 msec.

The higher layers in the UE may increment the BFI count (by one) in a second seventh BFI counter (denoted by BFI_COUNTER_7-2) if the higher layers receive from the physical layer in the UE that the radio link quality of resource configurations indicated in the joint DL and UL TCI state(s) and separate DL TCI state(s) in the seventh BFD RS set q0_7 is worse than Qout. The UE may declare a DL and/or UL beam failure for the seventh BFD RS set q0_7 if the BFI count in the second seventh BFI counter BFI_COUNTER_7-2 for the seventh BFD RS set q0_7 reaches the maximum number of BFI counts (e.g., provided by the higher layer parameter maxBFIcount) before a second seventh BFD timer expires. After the higher layers in the UE declare DL and/or UL beam failure for the seventh BFD RS set q0_7 according to the resource configurations indicated in the joint DL and UL TCI state(s) and separate DL TCI state(s), the higher layers in the UE may reset the BFI count in the second seventh BFI counter BFI_COUNTER_7-2 or the second seventh BFD timer to zero.

In yet another example, the physical layer in the UE assesses the radio link quality according to resource configurations indicated in the joint DL and UL TCI state(s) and separate UL TCI state(s) in the seventh BFD RS set q0_7 against the BFD threshold Qout. Furthermore, the physical layer in the UE provides an indication to higher layers when the radio link quality for all corresponding resource configurations indicated in the joint DL and UL TCI state(s) and separate UL TCI state(s) in the seventh BFD RS set q0_7 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the seventh BFD RS set q0_7 that the UE uses to assess the radio link quality and 2 msec, or a periodicity determined by the maximum between the shortest periodicity among the SSBs on the PCell or the PSCell and/or the periodic CSI-RS configurations indicated in the joint DL and UL TCI state(s) and separate UL TCI state(s) in the seventh BFD RS set q0_7 that the UE uses to assess the radio link quality and 2 msec.

The higher layers in the UE may increment the BFI count (by one) in a third seventh BFI counter (denoted by BFI_COUNTER_7-3) if the higher layers receive from the physical layer in the UE that the radio link quality of resource configurations indicated in the joint DL and UL TCI state(s) and separate UL TCI state(s) in the seventh BFD RS set q0_7 is worse than Qout. The UE may declare a DL and/or UL beam failure for the seventh BFD RS set q0_7 if the BFI count in the third seventh BFI counter BFI_ COUNTER_7-3 for the seventh BFD RS set q0_7 reaches the maximum number of BFI counts (e.g., provided by the higher layer parameter maxBFIcount) before a third seventh BFD timer expires. After the higher layers in the UE declare DL and/or UL beam failure for the seventh BFD RS set q0_7 according to the resource configurations indicated in the joint DL and UL TCI state(s) and separate UL TCI state(s), the higher layers in the UE may reset the BFI count in the third seventh BFI counter BFI_COUNTER_7-3 or the third seventh BFD timer to zero.

In yet another example, the physical layer in the UE assesses the radio link quality according to resource configurations indicated in the separate DL TCI state(s) and separate UL TCI state(s) in the seventh BFD RS set q0_7 against the BFD threshold Qout. Furthermore, the physical layer in the UE provides an indication to higher layers when the radio link quality for all corresponding resource configurations indicated in the separate DL TCI state(s) and separate UL TCI state(s) in the seventh BFD RS set q0_7 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the seventh BFD RS set q0_7 that the UE uses to assess the radio link quality and 2 msec, or a periodicity determined by the maximum between the shortest periodicity among the SSBs on the PCell or the PSCell and/or the periodic CSI-RS configurations indicated in the separate DL TCI state(s) and separate UL TCI state(s) in the seventh BFD RS set q0_7 that the UE uses to assess the radio link quality and 2 msec.

The higher layers in the UE may increment the BFI count (by one) in a fourth seventh BFI counter (denoted by BFI_COUNTER_7-4) if the higher layers receive from the physical layer in the UE that the radio link quality of resource configurations indicated in the separate DL TCI state(s) and separate UL TCI state(s) in the seventh BFD RS set q0_7 is worse than Qout. The UE may declare a DL and/or UL beam failure for the seventh BFD RS set q0_7 if the BFI count in the fourth seventh BFI counter BFI_ COUNTER_7-4 for the seventh BFD RS set q0_7 reaches the maximum number of BFI counts (e.g., provided by the higher layer parameter maxBFIcount) before a fourth seventh BFD timer expires. After the higher layers in the UE declare DL and/or UL beam failure for the seventh BFD RS set q0_7 according to the resource configurations indicated in the separate DL TCI state(s) and separate UL TCI state(s), the higher layers in the UE may reset the BFI count in the fourth seventh BFI counter BFI_COUNTER_7-4 or the fourth seventh BFD timer to zero.

In yet another example, the physical layer in the UE assesses the radio link quality according to resource configurations indicated in the separate DL TCI state(s) in the seventh BFD RS set q0_7 against the BFD threshold Qout. Furthermore, the physical layer in the UE provides an indication to higher layers when the radio link quality for all corresponding resource configurations indicated in the separate DL TCI state(s) in the seventh BFD RS set q0_7 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the seventh BFD RS set q0_7 that the UE uses to assess the radio link quality and 2 msec, or a periodicity determined by the maximum between the shortest periodicity among the SSBs on the PCell or the PSCell and/or the periodic CSI-RS configurations indicated in the separate DL TCI state(s) in the seventh BFD RS set q0_7 that the UE uses to assess the radio link quality and 2 msec.

The higher layers in the UE may increment the BFI count (by one) in a fifth seventh BFI counter (denoted by BFI_COUNTER_7-5) if the higher layers receive from the physical layer in the UE that the radio link quality of resource configurations indicated in the separate DL TCI state(s) in the seventh BFD RS set q0_7 is worse than Qout. The UE may declare a DL beam failure for the seventh BFD RS set q0_7 if the BFI count in the fifth seventh BFI counter BFI_COUNTER_7-5 for the seventh BFD RS set q0_7 reaches the maximum number of BFI counts (e.g., provided by the higher layer parameter maxBFIcount) before a fifth seventh BFD timer expires. After the higher layers in the UE declare DL beam failure for the seventh BFD RS set q0_7 according to the resource configurations indicated in the separate DL TCI state(s), the higher layers in the UE may reset the BFI count in the fifth seventh BFI counter BFI_COUNTER_7-5 or the fifth seventh BFD timer to zero.

In yet another example, the physical layer in the UE assesses the radio link quality according to resource configurations indicated in the separate UL TCI state(s) in the seventh BFD RS set q0_7 against the BFD threshold Qout. Furthermore, the physical layer in the UE provides an indication to higher layers when the radio link quality for all corresponding resource configurations indicated in the separate UL TCI state(s) in the seventh BFD RS set q0_7 that the UE uses to assess the radio link quality is worse than the threshold Qout.

The physical layer informs the higher layers when the radio link quality is worse than the BFD threshold Qout a periodicity determined by the maximum between the shortest periodicity among the SSBs on the PCell or the PSCell and/or the periodic CSI-RS configurations in the seventh BFD RS set q0_7 that the UE uses to assess the radio link quality and 2 msec, or a periodicity determined by the maximum between the shortest periodicity among the SSBs on the PCell or the PSCell and/or the periodic CSI-RS configurations indicated in the separate UL TCI state(s) in the seventh BFD RS set q0_7 that the UE uses to assess the radio link quality and 2 msec.

The higher layers in the UE may increment the BFI count (by one) in a sixth seventh BFI counter (denoted by BFI_COUNTER_7-6) if the higher layers receive from the physical layer in the UE that the radio link quality of resource configurations indicated in the separate UL TCI state(s) in the seventh BFD RS set q0_7 is worse than Qout. The UE may declare an UL beam failure for the seventh BFD RS set q0_7 if the BFI count in the sixth seventh BFI counter BFI_COUNTER_7-6 for the seventh BFD RS set q0_7 reaches the maximum number of BFI counts (e.g., provided by the higher layer parameter maxBFIcount) before a sixth seventh BFD timer expires. After the higher layers in the UE declare UL beam failure for the seventh BFD RS set q0_7 according to the resource configurations indicated in the separate UL TCI state(s), the higher layers in the UE may reset the BFI count in the sixth seventh BFI counter BFI_COUNTER_7-6 or the sixth seventh BFD timer to zero.

In yet another example, the physical layer in the UE assesses the radio link quality according to resource configurations indicated in the joint DL and UL TCI state(s) in the seventh BFD RS set q0_7 against the BFD threshold Qout. Furthermore, the physical layer in the UE provides an indication to higher layers when the radio link quality for all corresponding resource configurations indicated in the joint DL and UL TCI state(s) in the seventh BFD RS set q0_7 that the UE uses to assess the radio link quality is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the seventh BFD RS set q0_7 that the UE uses to assess the radio link quality and 2 msec, or a periodicity determined by the maximum between the shortest periodicity among the SSBs on the PCell or the PSCell and/or the periodic CSI-RS configurations indicated in the joint DL and UL TCI state(s) in the seventh BFD RS set q0_7 that the UE uses to assess the radio link quality and 2 msec.

The higher layers in the UE may increment the BFI count (by one) in a seventh BFI counter (denoted by BFI_COUNTER_7-7) if the higher layers receive from the physical layer in the UE that the radio link quality of resource configurations indicated in the joint DL and UL TCI state(s) in the seventh BFD RS set q0_7 is worse than Qout. The UE may declare a DL and/or UL beam failure for the seventh BFD RS set q0_7 if the BFI count in the seventh seventh BFI counter BFI_COUNTER_7-7 for the seventh BFD RS set q0_7 reaches the maximum number of BFI counts (e.g., provided by the higher layer parameter maxBFIcount) before a seventh seventh BFD timer expires. After the higher layers in the UE declare DL and/or UL beam failure for the seventh BFD RS set q0_7 according to the resource configurations indicated in the joint DL and UL TCI state(s), the higher layers in the UE may reset the BFI count in the seventh BFI counter BFI_COUNTER_7-7 or the seventh seventh BFD timer to zero.

Under the Rel. 17 unified TCI framework, for the explicit BFD RS configuration, following examples can be provided.

In one example, the higher layers in the UE may increment the BFI count (by one) in a first BFI counter (denoted by BFI_COUNTER_1) if the higher layers receive from the physical layer in the UE that the radio link quality of the first BFD RS set q0_1 is worse than Qout. The UE may declare a DL and/or UL beam failure for the first BFD RS set q0_1 if the BFI count in the first BFI counter BFI_COUNTER_1 for the first BFD RS set q0_1 reaches the maximum number of BFI counts (e.g., provided by the higher layer parameter maxBFIcount) before a first BFD timer expires. After the higher layers in the UE declare DL and/or UL beam failure for the first BFD RS set q0_1, the higher layers in the UE may reset the BFI count in the first BFI counter BFI_COUNTER_1 or the first BFD timer to zero.

In one example, the higher layers in the UE may increment the BFI count (by one) in a second BFI counter (denoted by BFI_COUNTER_2) if the higher layers receive from the physical layer in the UE that the radio link quality of the second BFD RS set q0_2 is worse than Qout. The UE may declare a DL beam failure for the second BFD RS set q0_2 if the BFI count in the second BFI counter BFI_COUNTER_2 for the second BFD RS set q0_2 reaches the maximum number of BFI counts (e.g., provided by the higher layer parameter maxBFIcount) before a second BFD timer expires. After the higher layers in the UE declare DL beam failure for the second BFD RS set q0_2, the higher layers in the UE may reset the BFI count in the second BFI counter BFI_COUNTER_2 or the second BFD timer to zero.

In one example, the higher layers in the UE may increment the BFI count (by one) in a third BFI counter (denoted by BFI_COUNTER_3) if the higher layers receive from the physical layer in the UE that the radio link quality of the third BFD RS set q0_3 is worse than Qout. The UE may declare an UL beam failure for the third BFD RS set q0_3 if the BFI count in the third BFI counter BFI_COUNTER_3 for the third BFD RS set q0_3 reaches the maximum number of BFI counts (e.g., provided by the higher layer parameter maxBFIcount) before a third BFD timer expires. After the higher layers in the UE declare UL beam failure for the third BFD RS set q0_3, the higher layers in the UE may reset the BFI count in the third BFI counter BFI_COUNTER_3 or the third BFD timer to zero.

In one example, the higher layers in the UE may increment the BFI count (by one) in a first eighth BFI counter (denoted by BFI_COUNTER_8-1) if the higher layers receive from the physical layer in the UE that the radio link quality of one or more SSB indexes on the PCell or the PSCell or periodic CSI-RS resource configuration indexes in the master/main BFD RS set q0 with same values as the RS indexes in the RS sets indicated in one or more joint DL and UL TCI states is worse than Qout. The UE may declare a DL and/or UL beam failure for the master/main BFD RS set q0 if the BFI count in the first eighth BFI counter BFI_COUNTER_8-1 for the master/main BFD RS set q0 reaches the maximum number of BFI counts (e.g., provided by the higher layer parameter maxBFIcount) before a first eighth BFD timer expires.

After the higher layers in the UE declare DL and/or UL beam failure for the master/main BFD RS set q0 according to the one or more SSB indexes on the PCell or the PSCell or periodic CSI-RS resource configuration indexes in the master/main BFD RS set q0 with same values as the RS indexes in the RS sets indicated in the joint DL and UL TCI state(s), the higher layers in the UE may reset the BFI count in the first eighth BFI counter BFI_COUNTER_8-1 or the first eighth BFD timer to zero.

In one example, the higher layers in the UE may increment the BFI count (by one) in a second eighth BFI counter (denoted by BFI_COUNTER_8-2) if the higher layers receive from the physical layer in the UE that the radio link quality of one or more SSB indexes on the PCell or the PSCell or periodic CSI-RS resource configuration indexes in the master/main BFD RS set q0 with same values as the RS indexes in the RS sets indicated in one or more separate DL TCI states is worse than Qout. The UE may declare a DL beam failure for the master/main BFD RS set q0 if the BFI count in the second eighth BFI counter BFI_ COUNTER_8-2 for the master/main BFD RS set q0 reaches the maximum number of BFI counts (e.g., provided by the higher layer parameter maxBFIcount) before a second eighth BFD timer expires.

After the higher layers in the UE declare DL beam failure for the master/main BFD RS set q0 according to the one or more SSB indexes on the PCell or the PSCell or periodic CSI-RS resource configuration indexes in the master/main BFD RS set q0 with same values as the RS indexes in the RS sets indicated in the separate DL TCI state(s), the higher layers in the UE may reset the BFI count in the second eighth BFI counter BFI_COUNTER_8-2 or the second eighth BFD timer to zero.

In one example, the higher layers in the UE may increment the BFI count (by one) in a third eighth BFI counter (denoted by BFI_COUNTER_8-3) if the higher layers receive from the physical layer in the UE that the radio link quality of one or more SSB indexes on the PCell or the PSCell or periodic CSI-RS resource configuration indexes in the master/main BFD RS set q0 with same values as the RS indexes in the RS sets indicated in one or more separate UL TCI states is worse than Qout. The UE may declare an UL beam failure for the master/main BFD RS set q0 if the BFI count in the third eighth BFI counter BFI_COUNTER_8-3 for the master/main BFD RS set q0 reaches the maximum number of BFI counts (e.g., provided by the higher layer parameter maxBFIcount) before a third eighth BFD timer expires.

After the higher layers in the UE declare UL beam failure for the master/main BFD RS set q0 according to the one or more SSB indexes on the PCell or the PSCell or periodic CSI-RS resource configuration indexes in the master/main BFD RS set q0 with same values as the RS indexes in the RS sets indicated in the separate UL TCI state(s), the higher layers in the UE may reset the BFI count in the third eighth BFI counter BFI_COUNTER_8-3 or the third eighth BFD timer to zero.

In one example, the higher layers in the UE may increment the BFI count (by one) in a fourth eighth BFI counter (denoted by BFI_COUNTER_8-4) if the higher layers receive from the physical layer in the UE that the radio link quality of one or more SSB indexes on the PCell or the PSCell or periodic CSI-RS resource configuration indexes in the master/main BFD RS set q0 with same values as the RS indexes in the RS sets indicated in one or more joint DL and UL TCI states and one or more separate DL TCI states is worse than Qout. The UE may declare a DL and/or UL beam failure for the master/main BFD RS set q0 if the BFI count in the fourth eighth BFI counter BFI_COUNTER_8-4 for the master/main BFD RS set q0 reaches the maximum number of BFI counts (e.g., provided by the higher layer parameter maxBFIcount) before a fourth eighth BFD timer expires.

After the higher layers in the UE declare DL and/or UL beam failure for the master/main BFD RS set q0 according to the one or more SSB indexes on the PCell or the PSCell or periodic CSI-RS resource configuration indexes in the master/main BFD RS set q0 with same values as the RS indexes in the RS sets indicated in the joint DL and UL TCI state(s) and separate DL TCI state(s), the higher layers in the UE may reset the BFI count in the fourth eighth BFI counter BFI_COUNTER_8-4 or the fourth eighth BFD timer to zero.

In one example, the higher layers in the UE may increment the BFI count (by one) in a fifth eighth BFI counter (denoted by BFI_COUNTER_8-5) if the higher layers receive from the physical layer in the UE that the radio link quality of one or more SSB indexes on the PCell or the PSCell or periodic CSI-RS resource configuration indexes in the master/main BFD RS set q0 with same values as the RS indexes in the RS sets indicated in one or more joint DL and UL TCI states and one or more separate UL TCI states is worse than Qout. The UE may declare a DL and/or UL beam failure for the master/main BFD RS set q0 if the BFI count in the fifth eighth BFI counter BFI_COUNTER_8-5 for the master/main BFD RS set q0 reaches the maximum number of BFI counts (e.g., provided by the higher layer parameter maxBFIcount) before a fifth eighth BFD timer expires.

After the higher layers in the UE declare DL and/or UL beam failure for the master/main BFD RS set q0 according to the one or more SSB indexes on the PCell or the PSCell or periodic CSI-RS resource configuration indexes in the master/main BFD RS set q0 with same values as the RS indexes in the RS sets indicated in the joint DL and UL TCI state(s) and separate UL TCI state(s), the higher layers in the UE may reset the BFI count in the fifth eighth BFI counter BFI_COUNTER_8-5 or the fifth eighth BFD timer to zero.

In one example, the higher layers in the UE may increment the BFI count (by one) in a sixth eighth BFI counter (denoted by BFI_COUNTER_8-6) if the higher layers receive from the physical layer in the UE that the radio link quality of one or more SSB indexes on the PCell or the PSCell or periodic CSI-RS resource configuration indexes in the master/main BFD RS set q0 with same values as the RS indexes in the RS sets indicated in one or more separate DL TCI states and one or more separate UL TCI states is worse than Qout. The UE may declare a DL and/or UL beam failure for the master/main BFD RS set q0 if the BFI count in the sixth eighth BFI counter BFI_COUNTER_8-6 for the master/main BFD RS set q0 reaches the maximum number of BFI counts (e.g., provided by the higher layer parameter maxBFIcount) before a sixth eighth BFD timer expires.

After the higher layers in the UE declare DL and/or UL beam failure for the master/main BFD RS set q0 according to the one or more SSB indexes on the PCell or the PSCell or periodic CSI-RS resource configuration indexes in the master/main BFD RS set q0 with same values as the RS indexes in the RS sets indicated in the separate DL TCI state(s) and separate UL TCI state(s), the higher layers in the UE may reset the BFI count in the sixth eighth BFI counter BFI_COUNTER_8-6 or the sixth eighth BFD timer to zero.

In one example, the higher layers in the UE may increment the BFI count (by one) in a seventh eighth BFI counter (denoted by BFI_COUNTER_8-7) if the higher layers receive from the physical layer in the UE that the radio link quality of one or more SSB indexes on the PCell or the PSCell or periodic CSI-RS resource configuration indexes in the master/main BFD RS set q0 with same values as the RS indexes in the RS sets indicated in one or more joint DL and UL TCI states, one or more separate DL TCI states and one or more separate UL TCI states is worse than Qout. The UE may declare a DL and/or UL beam failure for the master/ main BFD RS set q0 if the BFI count in the seventh eighth BFI counter BFI_COUNTER_8-7 for the master/main BFD RS set q0 reaches the maximum number of BFI counts (e.g., provided by the higher layer parameter maxBFIcount) before a seventh eighth BFD timer expires.

After the higher layers in the UE declare DL and/or UL beam failure for the master/main BFD RS set q0 according to the one or more SSB indexes on the PCell or the PSCell or periodic CSI-RS resource configuration indexes in the master/main BFD RS set q0 with same values as the RS indexes in the RS sets indicated in the joint DL and UL TCI state(s), separate DL TCI state(s) and separate UL TCI state(s), the higher layers in the UE may reset the BFI count in the seventh eighth BFI counter BFI_COUNTER_8-7 or the seventh eighth BFD timer to zero.

When/if more than one (e.g., 2) BFD RS sets—e.g., the n'-th (or m'-th) BFD RS set or BFD RS set n' (or m'), where n'∈{1 . . . . N} and m'∈{1 . . . . M} with N>1 or M>1 (e.g., N=2 or M=2)—are determined/configured according to one or more of the design examples specified herein in the present disclosure, the beam failure declaration configuration(s)/procedure(s)/criterion(s) as specified/described herein in the present disclosure could be applied/associated to one or more or each of the BFD RS sets (and therefore, the corresponding TRP(s) or CORESET pool index(es)).

As discussed in the present disclosure, a UE can be configured with/provided by the network a NBI RS set q1 of periodic CSI-RS resource configuration indexes or SSB indexes via the higher layer parameter candidate-BeamRSList for radio link quality measurement and identifying potential new beam(s) to recover the failed beam(s)/link(s). The UE expects single-port or two-port CSI-RS with frequency density equal to 1 or 3 REs per RB in the set q1. The UE could assess the radio link quality according to the set q1 of resource configurations against a threshold Qin. The UE may apply the Qin threshold to the L1-RSRP measurement obtained from a SSB in q1, and apply the Qin threshold to the L1-RSRP measurement obtained from a CSI-RS resource in q1 after scaling a respective CSI-RS reception power with a value provided by powerControlOffsetSS.

As discussed in the present disclosure, under the Rel. 17 unified TCI framework, the UE could declare different types of beam failure such as DL and/or UL beam failure, DL-only beam failure or UL-only beam failure. Hence, the UE could be configured by the network various sets of resource configurations for radio link quality measurement and potential new beam(s) identification according to the beam failure type(s).

In one example, the UE could be configured with/provided by the network a first NBI RS set q1_1 of periodic CSI-RS resource configuration indexes or SSB indexes for radio link quality measurement and identifying potential new beam(s) to recover a DL and/or UL beam failure. The UE expects single-port or two-port CSI-RS with frequency density equal to 1 or 3 REs per RB in the set q1_1. The UE could assess the radio link quality according to the set q1_1 of resource configurations against a threshold Qin. The UE may apply the Qin threshold to the L1-RSRP measurement obtained from a SSB in q1_1, and apply the Qin threshold to the L1-RSRP measurement obtained from a CSI-RS resource in q1_1 after scaling a respective CSI-RS reception power with a value provided by powerControlOffsetSS. The UE may identity the periodic CSI-RS resource configuration index or SSB index in the first NBI RS set q1_1, denoted by q_new_du, that corresponds to the largest/highest measured L1-RSRP among those larger than or equal to the Qin threshold.

In another example, the UE could be configured with/provided by the network a second NBI RS set q1_2 of periodic CSI-RS resource configuration indexes or SSB indexes for radio link quality measurement and identifying potential new beam(s) to recover a DL beam failure. The UE expects single-port or two-port CSI-RS with frequency density equal to 1 or 3 REs per RB in the set q1_2. The UE could assess the radio link quality according to the set q1_2 of resource configurations against a threshold Qin. The UE may apply the Qin threshold to the L1-RSRP measurement obtained from a SSB in q1_2, and apply the Qin threshold to the L1-RSRP measurement obtained from a CSI-RS resource in q1_2 after scaling a respective CSI-RS reception power with a value provided by powerControlOffsetSS. The UE may identity the periodic CSI-RS resource configuration index or SSB index in the second NBI RS set q1_2, denoted by q_new_d, which corresponds to the largest/highest measured L1-RSRP among those larger than or equal to the Qin threshold.

In yet another example, the UE could be configured with/provided by the network a third NBI RS set q1_3 of periodic CSI-RS resource configuration indexes or SSB indexes for radio link quality measurement and identifying potential new beam(s) to recover an UL beam failure. The UE expects single-port or two-port CSI-RS with frequency density equal to 1 or 3 REs per RB in the set q1_3. The UE could assess the radio link quality according to the set q1_3 of resource configurations against a threshold Qin. The UE may apply the Qin threshold to the L1-RSRP measurement obtained from a SSB in q1_3, and apply the Qin threshold to the L1-RSRP measurement obtained from a CSI-RS resource in q1_3 after scaling a respective CSI-RS reception power with a value provided by powerControlOffsetSS. The UE may identity the periodic CSI-RS resource configuration index or SSB index in the third NBI RS set q1_3, denoted by q_new_u, which corresponds to the largest/highest measured L1-RSRP among those larger than or equal to the Qin threshold.

In yet another example, the UE could be configured with/provided by the network a master/main NBI RS set q1 of periodic CSI-RS resource configuration indexes or SSB indexes for radio link quality measurement and identifying potential new beam(s) to recover a DL and/or UL beam failure, a DL beam failure or an UL beam failure. The UE expects single-port or two-port CSI-RS with frequency density equal to 1 or 3 REs per RB in the set q1.

In one example, the UE could assess the radio link quality of one or more resource configurations in the set q1 configured for identifying potential new beam(s) to recover a DL and/or UL beam failure against a threshold Qin. The UE may apply the Qin threshold to the L1-RSRP measurement obtained from a SSB in q1, and apply the Qin threshold to the L1-RSRP measurement obtained from a CSI-RS resource in q1 after scaling a respective CSI-RS reception power with a value provided by powerControlOffsetSS. The UE may identity the periodic CSI-RS resource configuration index or SSB index in the master/main NBI RS set q1, denoted by q_new_du, that corresponds to the largest/highest measured L1-RSRP among those larger than or equal to the Qin threshold measured on the one or more resource configurations in the set q1 configured for identifying potential new beam(s) to recover a DL and/or UL beam failure.

In another example, the UE could assess the radio link quality of one or more resource configurations in the set q1 configured for identifying potential new beam(s) to recover a DL beam failure against a threshold Qin. The UE may apply the Qin threshold to the L1-RSRP measurement obtained from a SSB in q1, and apply the Qin threshold to the L1-RSRP measurement obtained from a CSI-RS resource in q1 after scaling a respective CSI-RS reception power with a value provided by powerControlOffsetSS. The UE may identity the periodic CSI-RS resource configuration index or SSB index in the master/main NBI RS set q1, denoted by q_new_d, which corresponds to the largest/ highest measured L1-RSRP among those larger than or equal to the Qin threshold measured on the one or more resource configurations in the set q1 configured for identifying potential new beam(s) to recover a DL beam failure.

In yet another example, the UE could assess the radio link quality of one or more resource configurations in the set q1 configured for identifying potential new beam(s) to recover an UL beam failure against a threshold Qin. The UE may apply the Qin threshold to the L1-RSRP measurement obtained from a SSB in q1, and apply the Qin threshold to the L1-RSRP measurement obtained from a CSI-RS resource in q1 after scaling a respective CSI-RS reception power with a value provided by powerControlOffsetSS. The UE may identity the periodic CSI-RS resource configuration index or SSB index in the master/main NBI RS set q1, denoted by q_new_u, which corresponds to the largest/ highest measured L1-RSRP among those larger than or equal to the Qin threshold measured on the one or more resource configurations in the set q1 configured for identifying potential new beam(s) to recover an UL beam failure.

As discussed in the present disclosure, the UE could declare a DL beam failure and determine/select index q_new_d.

As discussed in the present disclosure, the UE could declare an UL beam failure and determine/select index q_new_u.

As discussed in the present disclosure, the UE could declare a DL and/or UL beam failure and determine/select: (1) index q_new_du; (2) index q_new_d; and/or (3) index q_new_u.

For the PCell or the PSCell, upon request from higher layers, the UE provides to higher layers the periodic CSI-RS configuration indexes and/or SSB indexes from the sets q1, q1_1, q1_2 or q1_3 and the corresponding L1-RSRP measurements that are larger than or equal to the Qin threshold. For the SCell, upon request from higher layers, the UE indicates to higher layers whether there is at least one periodic CSI-RS configuration index or SSB index from the sets q1, q1_1, q1_2 or q1_3 with corresponding L1-RSRP measurements that are larger than or equal to the Qin threshold, and provides the periodic CSI-RS configuration indexes or SSB indexes from the q1, q1_1, q1_2 or q1_3 and the corresponding L1-RSRP measurements that are larger than or equal to the Qin threshold, if any.

For the PCell or the PSCell, the UE can be provided, by PRACH-ResourceDedicatedBFR, a configuration for PRACH transmission as described in the 3GPP TS 38.213. The UE could transmit at least one PRACH preamble according to antenna port quasi co-location parameters associated with periodic CSI-RS resource configuration or with SSB associated with index q_new provided by higher layers. The index q_new could correspond to the periodic CSI-RS resource configuration index or the SSB index in the NBI RS sets q1, q1_1, q1_2 or q1_3 that has the largest/ highest measured L1-RSRP among those larger than or equal to the Qin threshold.

In one example, if the UE declares a DL and/or UL beam failure, q_new could correspond to q_new_dl, q_new_d or q_new_u. In one example, the UE could transmit one PRACH preamble according to antenna port quasi co-location parameters associated with periodic CSI-RS resource configuration or with SSB associated with index q_new_d provided by higher layers, and another PRACH preamble according to antenna port quasi co-location parameters associated with periodic CSI-RS resource configuration or with SSB associated with index q_new_u provided by higher layers.

In another example, if the UE declares a DL beam failure, q_new could correspond to q_new_d.

In yet another example, if the UE declares an UL beam failure, q_new could correspond to q_new_u.

For the SCell, the UE can be provided, by schedulingRequestID-BFR-SCell, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding SCell(s) with radio link quality worse than Qout, indication(s) of presence of q_new for corresponding SCell(s), and index(es) q_new for a periodic CSI-RS configuration or for a SSB provided by higher layers, if any, for corresponding SCell(s), where the index q_new could correspond to the periodic CSI-RS resource configuration index or the SSB index in the NBI RS sets q1, q1_1, q1_2 or q1_3 that has the largest/highest measured L1-RSRP among those larger than or equal to the Qin threshold.

In one example, if the UE declares a DL and/or UL beam failure, q_new could correspond to q_new_dl, q_new_d or q_new_u. In one example, the UE could provide in the first PUSCH MAC CE index(es) for at least corresponding SCell(s) with radio link quality worse than Qout, indication of presence of q_new_d for corresponding SCell(s), indication of presence of q_new_u for corresponding SCell(s), index q_new_d for a periodic CSI-RS configuration or for a SSB provided by higher layers, if any, and index q_new_u for a periodic CSI-RS configuration or for a SSB provided by higher layers, if any, for corresponding SCell(s).

In another example, if the UE declares a DL beam failure, q_new could correspond to q_new_d.

In yet another example, if the UE declares an UL beam failure, q_new could correspond to q_new_u.

For the PCell or the PSCell or the SCell, the UE could provide/indicate to the network, e.g., via the first PUSCH MAC CE or BFR MAC CE as described in the 3GPP TS 38.213, whether the beam failure request is for DL only, UL only, or both DL and UL.

As discussed in the present disclosure, the UE could provide/indicate to the network, e.g., via the first PUSCH MAC CE or BFR MAC CE as described in the 3GPP TS 38.213, that the beam failure request is for DL only.

As discussed in the present disclosure, the UE could provide/indicate to the network, e.g., via the first PUSCH MAC CE or BFR MAC CE as described in the 3GPP TS 38.213 that the beam failure request is for UL only.

As discussed in the present disclosure, the UE could provide/indicate to the network, e.g., via the first PUSCH MAC CE or BFR MAC CE as described in the 3GPP TS 38.213 that the beam failure request is for both DL and UL.

The UE could use a 1-bit flag/indicator to indicate the beam failure request types.

In one example, if the 1-bit flag/indicator is enabled/ configured, "0" could indicate beam failure request for DL and "1" could indicate beam failure request for UL. If the 1-bit flag/indicator is not enabled/configured, the beam failure request for both DL and UL is (implicitly) indicated.

In another example, if the 1-bit flag/indicator is enabled/configured, "0" could indicate beam failure request for UL and "1" could indicate beam failure request for DL. If the 1-bit flag/indicator is not enabled/configured, the beam failure request for both DL and UL is (implicitly) indicated.

In yet another example, if the 1-bit flag/indicator is enabled/configured, "0" could indicate beam failure request for DL and "1" could indicate beam failure request for both DL and UL. If the 1-bit flag/indicator is not enabled/configured, the beam failure request for UL is (implicitly) indicated.

In yet another example, if the 1-bit flag/indicator is enabled/configured, "0" could indicate beam failure request for both DL and UL and "1" could indicate beam failure request for DL. If the 1-bit flag/indicator is not enabled/configured, the beam failure request for UL is (implicitly) indicated.

In yet another example, if the 1-bit flag/indicator is enabled/configured, "0" could indicate beam failure request for UL and "1" could indicate beam failure request for both DL and UL. If the 1-bit flag/indicator is not enabled/configured, the beam failure request for DL is (implicitly) indicated.

In yet another example, if the 1-bit flag/indicator is enabled/configured, "0" could indicate beam failure request for both DL and UL and "1" could indicate beam failure request for UL. If the 1-bit flag/indicator is not enabled/configured, the beam failure request for DL is (implicitly) indicated.

Alternatively, the UE could use a 2-bit indicator with each state of the indicator indicating a beam failure request type, i.e., for DL only, for UL only or for both DL and UL.

For the PCell or the PSCell or the SCell, the UE could provide/indicate to the network, e.g., via the first PUSCH MAC CE or BFR MAC CE as described in the 3GPP TS 38.213, index(es) of one or more NBI RS sets q1, q1-1, q1-2 and/or q1-3, and/or index(es) of one or more BFD RS sets q0, q0_1, q0_2, q0_3, q0_4, q0_5, q0_6 and/or q0_7.

A UE could be configured by the network more than one (e.g., 2) NBI RS sets—e.g., the n'-th (or m'-th) NBI RS set or NBI RS set n' (or m'), where n'∈{1, . . . , N} and m'∈{1, . . . , M} with N>1 or M>1 (e.g., N=2 or M=2)—with one or more or each of the NBI RS sets configured according to those specified herein in the present disclosure. When/if more than one (e.g., 2) BFD RS sets—e.g., the n'-th (or m'-th) BFD RS set or BFD RS set n' (or m'), where n'∈{1, . . . , N} and m'∈{1, . . . , M} with N>1 or M>1 (e.g., N=2 or M=2)—are determined/configured according to one or more of the design examples specified herein in the present disclosure, the NBI RS sets could be one-to-one mapped/associated to the BFD RS sets—e.g., for N=2 (or M=2), the n'-th (or m'-th) NBI RS set could be mapped/associated to the n'-th (or m'-th) BFD RS set with n'=1,2 (or m'=1,2). Furthermore, the UE could be provided/indicated/configured by the network, e.g., via higher layer RRC signaling/parameter and/or MAC CE command and/or dynamic DCI based L1 signaling, that a NBI RS set configured according to those specified herein in the present disclosure, is for UL beam failure recovery, DL beam failure recovery, or both DL and UL beam failure recovery.

When/if more than one (e.g., 2) BFD RS sets—e.g., the n'-th (or m'-th) BFD RS set or BFD RS set n' (or m'), where n'∈{1, . . . , N} and m'∈{1, . . . , M} with N>1 or M>1 (e.g., N=2 or M=2)—are determined/configured according to one or more of the design examples specified herein in the present disclosure, the beam failure recovery request configuration(s)/procedure(s)/criterion(s) as specified/described herein in the present disclosure could be applied/associated to one or more or each of the BFD RS sets (and therefore, the corresponding TRP(s) or CORESET pool index(es)).

Upon receiving, from the network, the BFRR, the UE could update/reset the beam(s)/spatial filter(s) for DL and/or UL channel(s)/signal(s) according to the beam failure type.

In one embodiment, for the PCell or the PSCell, a UE can be provided a CORESET through a link to a search space set provided by recoverySearchSpaceId, as described in the 3GPP TS 38.213, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

For the PCell or the PSCell, the UE can be provided, by PRACH-ResourceDedicatedBFR, a configuration for PRACH transmission as described in the 3GPP TS 38.213. For PRACH transmission in slot n and according to antenna port quasi co-location parameters associated with periodic CSI-RS resource configuration or with SS/PBCH block associated with index q_new provided by higher layers, the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig.

For PDCCH monitoring in a search space set provided by recoverySearchSpaceId and for corresponding PDSCH reception, the UE assumes the same antenna port quasi-collocation parameters as the ones associated with index q_new until the UE receives by higher layers an activation for a TCI state provided by TCI-State_r17. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a TCI state update via MAC CE or DCI (e.g., DCI format 1_1 or 1_2 with or without DL assignment) based signaling.

As discussed in the present disclosure, if a UE is provided TCI-State_r17 indicating a unified TCI state for the PCell or the PSCell as described in the 3GPP TS 38.214, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in all CORESETs, and receives PDSCH and aperiodic CSI-RS in a resource from a CSI-RS resource set with same indicated TCI state as for the PDCCH and PDSCH, using the same antenna port quasi co-location parameters as the ones associated with the corresponding index q_new, if any, wherein q_new could correspond to q_new_d; and (2) transmits PUCCH using a same spatial domain filter as for the last PRACH transmission, and a power determined as described in the 3GPP TS 38.213 with q_u=0, q_d=q_new, and closed loop index l=0, wherein q_new could correspond to q_new_d.

In such instance, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and (2) the smallest of the SCS configurations of all the signal(s)/channels sharing the same indicated Rel. 17 TCI state/beam (e.g., provided by the higher layer parameter TCI-State_r17).

As discussed in the present disclosure, if a UE is provided TCI-State_r17 indicating a unified TCI state for the PCell or the PSCell as described in the 3GPP TS 38.214, after X symbols from a last symbol of a first PDCCH reception in a search space set provided by recoverySearchSpaceId where the UE detects a DCI format with CRC scrambled by C-RNTI or MCS-C-RNTI, the UE transmits PUCCH, PUSCH and SRS with same indicated TCI state as for the PUCCH and the PUSCH using a same spatial domain filter as for the last PRACH transmission, and transmits PUCCH using a power determined as described in the 3GPP TS 38.213 with $q_u=0$, $q_d=q\_new$, and closed loop index $l=0$.

In such instance, q_new could correspond to q_new_u, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and/or (2) the smallest of the SCS configurations of all the signal(s)/channels sharing the same indicated Rel. 17 TCI state/beam (e.g., provided by the higher layer parameter TCI-State_r17).

AS discussed in the present disclosure, if a UE is provided TCI-State_r17 indicating a unified TCI state for the PCell or the PSCell as described in the 3GPP TS 38.214, after X symbols from a last symbol of a first PDCCH reception in a search space set provided by recoverySearchSpaceId.

In such instance, the UE detects a DCI format with CRC scrambled by C-RNTI or MCS-C-RNTI, the UE: (1) monitors PDCCH in all CORESETs, and receives PDSCH and aperiodic CSI-RS in a resource from a CSI-RS resource set with same indicated TCI state as for the PDCCH and PDSCH, using the same antenna port quasi co-location parameters as the ones associated with the corresponding index q_new, if any, wherein q_new could correspond to q_new_du or q_new_d; and (2) transmits PUCCH, PUSCH and SRS with same indicated TCI state as for the PUCCH and the PUSCH using a same spatial domain filter as for the last PRACH transmission, and transmits PUCCH using a power determined as described in the 3GPP TS 38.213 with $q_u=0$, $q_d=q\_new$, and closed loop index $l=0$, wherein q_new could correspond to q_new_du or q_new_u.

In such instance, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and/or (2) the smallest of the SCS configurations of all the signal(s)/channels sharing the same indicated Rel. 17 TCI state/beam (e.g., provided by the higher layer parameter TCI-State_r17).

As discussed in the present disclosure, if a UE is provided TCI-State_r17 indicating a unified TCI state for the PCell or the PSCell as described in the 3GPP TS 38.214 and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in all CORESETs, and receives PDSCH and aperiodic CSI-RS in a resource from a CSI-RS resource set with same indicated TCI state as for the PDCCH and PDSCH, using the same antenna port quasi co-location parameters as the ones associated with the corresponding index q_new, if any, wherein q_new could correspond to q_new_d; and (2) transmits PUCCH using a same spatial domain filter as for the last PRACH transmission, and a power determined as described in the 3GPP TS 38.213 with $q_u=0$, $q_d=q\_new$, and closed loop index $l=0$, wherein q_new could correspond to q_new_d.

In such instance, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and/or (2) the smallest of the SCS configurations of all the signal(s)/channels sharing the same indicated Rel. 17 TCI state/beam (e.g., provided by the higher layer parameter TCI-State_r17).

As discussed in the present disclosure, if a UE is provided TCI-State_r17 indicating a unified TCI state for the PCell or the PSCell as described in the 3GPP TS 38.214 and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE transmits PUCCH, PUSCH and SRS with same indicated TCI state as for the PUCCH and the PUSCH using a same spatial domain filter as for the last PRACH transmission, and transmits PUCCH using a power determined as described in the 3GPP TS 38.213 with $q_u=0$, $q_d=q\_new$, and closed loop index $l=0$.

In such instance, q_new could correspond to q_new_u, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and/or (2) the smallest of the SCS configurations of all the signal(s)/channels sharing the same indicated Rel. 17 TCI state/beam (e.g., provided by the higher layer parameter TCI-State_r17).

As discussed in the present disclosure, if a UE is provided TCI-State_r17 indicating a unified TCI state for the PCell or the PSCell as described in the 3GPP TS 38.214 and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in all CORESETs, and receives PDSCH and aperiodic CSI-RS in a resource from a CSI-RS resource set with same indicated TCI state as for the PDCCH and PDSCH, using the same antenna port quasi co-location parameters as the ones associated with the corresponding index q_new, if any, where q_new could correspond to q_new_du or q_new_d; and (2) transmits PUCCH, PUSCH and SRS with same indicated TCI state as for the PUCCH and the PUSCH using a same spatial domain filter as for the last PRACH transmission, and transmits PUCCH using a power determined as described in the 3GPP TS 38.213 with $q_u=0$, $q_d=q\_new$, and closed loop index $l=0$, wherein q_new could correspond to q_new_du or q_new_u.

In such instance, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and/or (2) the smallest of the SCS configurations of all the signal(s)/channels sharing the same indicated Rel. 17 TCI state/beam (e.g., provided by the higher layer parameter TCI-State_r17).

As discussed in the present disclosure, if a UE is provided TCI-State_r17 indicating a unified TCI state, after X symbols from a last symbol of a PDCCH reception with a DCI format scheduling a PUSCH transmission with a same HARQ process number as for the transmission of the first PUSCH and having a toggled NDI field value, the UE: (1) monitors PDCCH in all CORESETs, and receives PDSCH and aperiodic CSI-RS in a resource from a CSI-RS resource set with same indicated TCI state as for the PDCCH and PDSCH, using the same antenna port quasi co-location parameters as the ones associated with the corresponding index q_new, if any, wherein q_new could correspond to q_new_d; and (2) transmits PUCCH using a same spatial domain filter as the one corresponding to q_new, and a power determined as described in the 3GPP TS 38.213 with q_u=0, q_d=q_new, and closed loop index l=0, wherein q_new could correspond to q_new_d.

In such instance, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and/or (2) the smallest of the SCS configurations of all the signal(s)/channels sharing the same indicated Rel. 17 TCI state/beam (e.g., provided by the higher layer parameter TCI-State_r17).

As discussed in the present disclosure, if a UE is provided TCI-State_r17 indicating a unified TCI state, after X symbols from a last symbol of a PDCCH reception with a DCI format scheduling a PUSCH transmission with a same HARQ process number as for the transmission of the first PUSCH and having a toggled NDI field value, the UE transmits PUCCH, PUSCH and SRS with same indicated TCI state as for the PUCCH and the PUSCH using a same spatial domain filter as the one corresponding to q_new, if any, and transmits PUCCH using a power determined as described in the 3GPP TS 38.213 with q_u=0, q_d=q_new, and closed loop index l=0.

In such instance, q_new could correspond to q_new_u, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and/or (2) the smallest of the SCS configurations of all the signal(s)/channels sharing the same indicated Rel. 17 TCI state/beam (e.g., provided by the higher layer parameter TCI-State_r17).

As discussed in the present disclosure, if a UE is provided TCI-State_r17 indicating a unified TCI state, after X symbols from a last symbol of a PDCCH reception with a DCI format scheduling a PUSCH transmission with a same HARQ process number as for the transmission of the first PUSCH and having a toggled NDI field value, the UE: (1) monitors PDCCH in all CORESETs, and receives PDSCH and aperiodic CSI-RS in a resource from a CSI-RS resource set with same indicated TCI state as for the PDCCH and PDSCH, using the same antenna port quasi co-location parameters as the ones associated with the corresponding index q_new, if any, wherein q_new could correspond to q_new_du or q_new_d; and (2) transmits PUCCH, PUSCH and SRS with same indicated TCI state as for the PUCCH and the PUSCH using a same spatial domain filter as the one corresponding to q_new, if any, and transmits PUCCH using a power determined as described in the 3GPP TS 38.213 with q_u=0, q_d=q_new, and closed loop index l=0, wherein q_new could correspond to q_new_du or q_new_u.

In such instance, X could correspond to 28, and the subcarrier spacing (SCS) for the X=28 symbols could correspond to one or more of: (1) the smallest of the SCS configurations of the active DL BWP for the PDCCH reception and of the active DL BWP(s) of the serving cell; and/or (2) the smallest of the SCS configurations of all the signal(s)/channels sharing the same indicated Rel. 17 TCI state/beam (e.g., provided by the higher layer parameter TCI-State_r17).

When/if more than one (e.g., 2) BFD RS sets—e.g., the n'-th (or m'-th) BFD RS set or BFD RS set n' (or m'), where n'∈{1, . . . , N} and m'∈{1, . . . , M} with N>1 or M>1 (e.g., N=2 or M=2)—are determined/configured according to one or more of the design examples specified herein in the present disclosure, the BFRR format(s) and/or beam resetting/updating configuration(s)/procedure(s)/criterion(s) as specified/described herein in the present disclosure could be applied/associated to one or more or each of the BFD RS sets (and therefore, the corresponding TRP(s) or CORESET pool index(es)).

Figure 13:
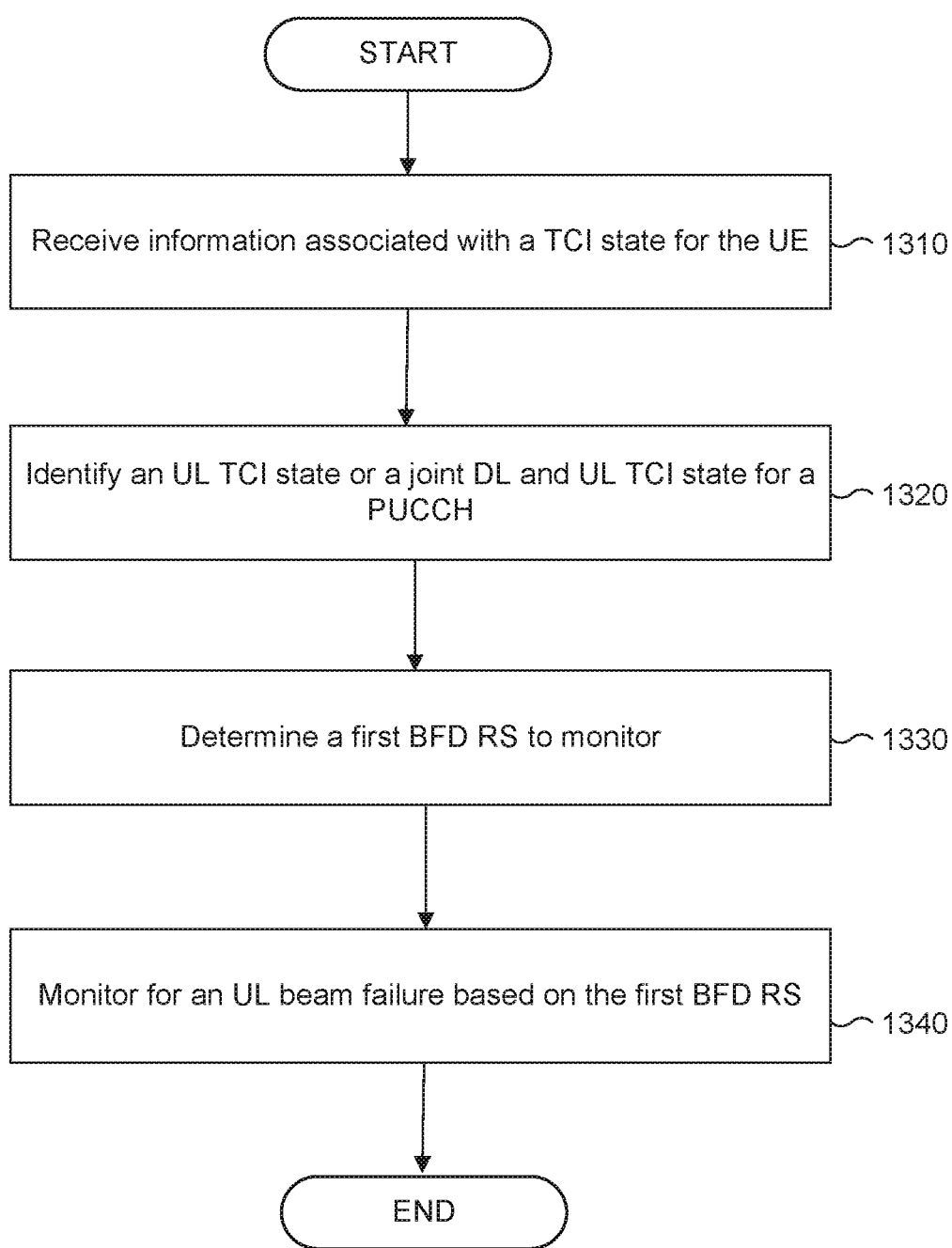
FIG. 13 illustrates method for BFD RS determination in a wireless communication system according to embodiments of the present disclosure

FIG. 13 illustrates an example method for BFD RS determination in a wireless communication system according to embodiments of the present disclosure. The steps of the method 1300 of FIG. 13 can be performed by any of the UEs 111-116 of FIG. 1, such as the UE 116 of FIG. 3. The method 1300 is for illustration only and other embodiments can be used without departing from the scope of the present disclosure.

The method 1300 begins with the UE receiving information associated with a TCI state for the UE (step 1310). For example, in step 1310, the information may be received via higher layer RRC signaling or MAC CE command or DCI signaling.

The UE then identifies an UL TCI state or a joint DL and UL TCI state for a PUCCH (step 1320). For example, in step 1320, the UE identifies the specific type of TCI state from the received information.

The UE then determines a BFD RS to monitor (step 1330). For example, in step 1330, the UE determines the BFD RS or a set of BFD RS to monitor based on the UL TCI state or the joint DL and UL TCI state for the PUCCH. For example, the UE implicitly determines the BFD RS based on the UL or joint TCI state. In another example, the information received by the UE may explicitly indicate a set of BFD RS configured for monitoring for the UL beam failure and the UE may determine, from the configured set, the BFD RS to monitor for the UL beam failure based on the UL or joint TCI state.

In various embodiments, the UE may also determine a BFD RS to monitor for a DL beam failure. For example, the UE may implicitly determine the BFD RS to monitor based on a DL TCI state or a joint DL and UL TCI state for a PDCCH. In some examples, the BFD RS for UL failure monitoring and the BFD RS for UL monitoring are in a same set of BFD RS used to monitor for the UL beam failure and the DL beam failure, respectively. In another example, the information received by the UE may explicitly indicate the set of BFD RS configured for monitoring for the UL beam failure and for a DL beam failure. Here, the UE may determine, as indicated above, the BFD RS to monitor for the UL beam failure from this set of BFD RS. The UE may also determine, based on a DL TCI state or a joint DL and UL TCI state for a PDCCH, a BFD RS to monitor for the DL beam failure from the set of BFD RS.

Thereafter, the UE monitors for an UL beam failure based on the first BFD RS (step 1340). For example, in step 1340, the UE receives and measures the BFD RS to determine whether a beam failure has occurred. In one example, the UE may identify an UL beam failure based on monitoring the first BFD RS identifying that a BFI counter meets or exceeds a threshold. Then, the UE may declare an UL beam failure, for example, by transmitting information indicating the UL beam failure to a BS.

In various embodiments, the UE may also monitor for the UL and the DL beam failure based on the determined BFD RSs, respectively. For example, the UE may identify, based on monitoring the set of BFD RS and identifying that a BFI counter meets or exceeds a threshold, the UL and DL beam failure. Then, the UE may declare an UL and DL beam failure, for example, by transmitting information indicating the UL and DL beam failure to the BS.

In various embodiments, the UE may also identify, based on the received information or other signaling, a set of NBI RSs configured for the UE to recover from the UL and/or DL beam failure. Then, in response to identification of the UL beam failure, the UE may determine an UL and/or DL beam for recovery based on the set of NBI RSs.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver; and
   a processor operably controller coupled with the transceiver, and configured to:
      receive, from a base station, information associated with a transmission configuration indication (TCI) state, wherein the information associated with the TCI state indicates a set of beam failure detection-reference signal (BFD-RS) for monitoring for an uplink (UL) beam failure and a downlink (DL) beam failure,
      based on the information associated with the TCI state, identify a UL TCI state or a joint DL and UL TCI state for a physical uplink control channel (PUCCH),
      based on the UL TCI state or the joint DL and UL TCI state for the PUCCH, determine a first BFD-RS for monitoring the UL beam failure from the set of BFD-RS and monitor the UL beam failure based on the first BFD RS,
      based on the information associated with the TCI state, identify a DL TCI state or a joint DL and UL TCI state for a physical downlink control channel (PDCCH),
      based on the UL TCI state or the joint DL and UL TCI state for the PDCCH, determine a second BFD-RS for monitoring the DL beam failure from the set of BFD-RS, and monitor for the DL beam failure based on the second BFD-RS.

2. The UE of claim 1, wherein the processer controller is further configured to:
   in case that a radio link quality of the first BFD-RS is worse than a Qout, increase a first beam failure index (BFI) count in a first BFI counter for the first BFD-RS, and
   in case that the first BFI counter reaches a maximum number of a first BFI counts, declare the UL beam failure.

3. The UE of claim 1, wherein the controller is further configured to:
   in case that a radio link quality of the second BFD-RS is worse than a Qout, increase a second beam failure index (BFI) count in a second BFI counter for the set of BFD-RS, and
   in case that the second BFI counter reaches a maximum number of a second BFI counts, declare the DL beam failure.

4. The UE of claim 1, wherein the controller is further configured to:
   based on a received new beam identification-reference signal (NBI-RS) set, identify a set of new beam identification (NBI) RSs for recovering the UL beam failure and the DL beam failure, and
   based on the set of NBI RSs, determine a UL beam or a DL beam for recovery.

5. A base station in a wireless communication system, the base station comprising:
   a transceiver; and
   a controller coupled with the transceiver, and configured to:
      transmit, to a user equipment (UE), information associated with a transmission configuration indication (TCI) state, wherein the information associated with the TCI state indicates a set of beam failure detection-reference signal (BFD-RS) for monitoring for an uplink (UL) beam failure and a downlink (DL) beam failure,
      transmit, to the UE, a first BFD-RS for the UL beam failure from the set of BFD-RS, wherein the first BFD-RS is based on a UL TCI state or a joint DL and UL TCI state for a physical uplink control channel (PUCCH), and
      transmit, to the UE, a second BFD-RS for the UL beam failure from the set of BFD-RS, wherein the second BFD-RS is based on a DL TCI state or the joint DL and UL TCI state for a physical downlink control channel (PDCCH).

6. The base station of claim 5, wherein the UL beam failure is determined in case that a first beam failure index (BFI) counter for the first BFD-RS reaches a maximum number of first BFI counts,
   wherein a first BFI count in the first BFI counter is increased in case that a radio link quality of the first BFD-RS is worse than a Qout,
   wherein the DL beam failure is determined in case that a second BFI counter for the second BFD-RS reaches a maximum number of second BFI counts, and
   wherein a second BFI count in the second BFI counter is increased in case that a radio link quality of the second BFD-RS is worse than a Qout.

7. The base station of claim 5, wherein the controller is further configured to:
   based on the first BFD-RS, receive, from the UE, first information indicating the UL beam failure, and

based on the second BFD-RS, receive, from the UE, second information indicating the DL beam failure.

8. A method for operating performed by a user equipment (UE) in a wireless communication system, the method comprising:

receiving, from a base station, information associated with a transmission configuration indication (TCI) state, wherein the information associated with the TCI state indicates a set of beam failure detection-reference signal (BFD-RS) for monitoring for an uplink (UL) beam failure and a downlink (DL) beam failure;

based on the information associated with the TCI state, identifying a UL TCI state or a joint DL and UL TCI state for a physical uplink control channel (PUCCH);

based on the UL TCI state or the joint DL and UL TCI state for the PUCCH, determining a first BFD-RS for monitoring the UL beam failure from the set of BFD-RS;

monitoring the UL beam failure based on the first BFD-RS;

based on the information associated with the TCI state, identifying a DL TCI state or a joint DL and UL TCI state for a physical downlink control channel (PDCCH);

based on the DL TCI state or the joint DL and UL TCI state for the PDCCH, determining a second BFD-RS for monitoring the DL beam failure from the set of BFD-RS; and monitoring for the DL beam failure based on the second BFD-RS.

9. The method of claim 8, further comprising:

in case that a radio link quality of the first BFD-RS is worse than a Qout, increasing a first beam failure index (BFI) count in a first BFI counter for the first BFD-RS; and in case that the first BFI counter reaches a maximum number of a first BFI counts, declaring the UL beam failure.

10. The method of claim 8, further comprising:

in case that a radio link quality of the second BFD-RS is worse than a Qout, increasing a second beam failure index (BFI) count in a second BFI counter for the set of BFD-RS; and in case that the second BFI counter reaches a maximum number of a second BFI counts, declaring the DL beam failure.

11. The method of claim 8, further comprising:

based on a received new beam identification-reference signal (NBI-RS) set, identifying, a set of new beam identification (NBI) RSs for recovering the UL beam failure and the DL beam failure; and based on the set of NBI RSs, determining a UL beam or a DL beam for recovery.

* * * * *